(12) United States Patent
Wippermann et al.

(10) Patent No.: US 8,945,458 B2
(45) Date of Patent: Feb. 3, 2015

(54) METHOD AND APPARATUS FOR PRODUCING A STRUCTURE, MOLDING TOOL

(75) Inventors: Frank Wippermann, Meiningen (DE); Jacques Duparre, Jena (DE); Peter Dannberg, Jena (DE); Andreas Braeuer, Schloeben (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 159 days.

(21) Appl. No.: 13/314,904

(22) Filed: Dec. 8, 2011

(65) Prior Publication Data
US 2012/0175796 A1 Jul. 12, 2012

Related U.S. Application Data

(63) Continuation of application No. PCT/EP2010/069296, filed on Dec. 9, 2010.

(30) Foreign Application Priority Data

Dec. 21, 2009 (DE) .......................... 10 2009 055 080

(51) Int. Cl.
*B28B 7/06* (2006.01)
*B29D 11/00* (2006.01)
(Continued)

(52) U.S. Cl.
CPC .... *B29D 11/00442* (2013.01); *B29D 11/00153* (2013.01); *B29C 2035/0827* (2013.01); *B29C 35/0894* (2013.01); *B29C 37/005* (2013.01); *B29C 33/405* (2013.01)
USPC ............................ 264/496; 264/313; 264/494

(58) Field of Classification Search
CPC .................. B29C 2033/0005; B29C 33/0011; B29C 2045/2671; B29C 45/2669; B29C 43/12; B29C 33/0055; B29C 2033/0094; B29C 2045/0027; B29C 45/0025; B29C 2045/0075; B29C 2035/0827; B29C 35/0894; B29C 37/005; B29C 33/405; B29D 11/00153; B29D 11/00442; B30B 5/02
USPC .................................................. 264/494, 496
See application file for complete search history.

(56) References Cited

U.S. PATENT DOCUMENTS 3,211,811 A 10/1965 Lanman
4,113,224 A * 9/1978 Clark et al. .................... 249/105
(Continued)

FOREIGN PATENT DOCUMENTS

DE 19717014 10/1998
DE 102005059161 6/2007
(Continued)

OTHER PUBLICATIONS
J. Lim et al: "Fabrication of Hybrid Microoptics Using UV Imprinting Process with Shrinkage Compensation Method", Japanese Journal of Applied Physics, vol. 47, No. 8, 2008, pp. 6719-6722.

*Primary Examiner* — Matthew Daniels
(74) *Attorney, Agent, or Firm* — Perkins Coie LLP; Michael A. Glenn

(57) ABSTRACT

A method of producing a structure from curable material by molding includes arranging a molding tool above a surface, so that in a region between the molding tool and the surface, the curable material adjoins the surface and a molding face of the molding tool which faces the surface, and so that additional curable material may continue to flow into the region. The method further includes irradiating the curable material in the region in a locally varying manner, so that the curable material cures at different speeds in a laterally varying manner and that shrinkages occurring during curing of the curable material are compensated for by the additional curable material. The method further includes applying a constant pressure to the additional curable material. Moreover, a second method and an apparatus for producing a structure from curable material by molding and a molding tool for an optical component are described.

6 Claims, 22 Drawing Sheets

(51) Int. Cl.
 *B29C 37/00* (2006.01)
 *B29C 33/40* (2006.01)
 *B29C 35/08* (2006.01)

(56) References Cited

U.S. PATENT DOCUMENTS

| | | | | |
|---|---|---|---|---|
| 4,477,328 A | * | 10/1984 | Broeksema et al. | 522/181 |
| 4,664,854 A | * | 5/1987 | Bakalar | 264/2.2 |
| 4,701,288 A | * | 10/1987 | Cook et al. | 264/1.38 |
| 4,812,346 A | * | 3/1989 | Sudo et al. | 428/65.1 |
| 4,895,430 A | | 1/1990 | Jalink et al. | |
| 5,110,514 A | * | 5/1992 | Soane | 264/496 |
| 5,269,867 A | | 12/1993 | Arai | |
| 5,510,818 A | | 4/1996 | Shimomura et al. | |
| 5,578,332 A | * | 11/1996 | Hamilton et al. | 425/555 |
| 5,817,545 A | * | 10/1998 | Wang et al. | 438/127 |
| 5,944,324 A | | 8/1999 | Schultheis et al. | |
| 5,975,875 A | * | 11/1999 | Crowe et al. | 425/215 |
| 6,344,162 B1 | * | 2/2002 | Miyajima | 264/272.14 |
| 6,368,522 B1 | * | 4/2002 | Ansell et al. | 264/1.1 |
| 6,405,993 B1 | * | 6/2002 | Morris | 249/141 |
| 6,419,859 B2 | * | 7/2002 | Tanaka et al. | 264/1.1 |
| 6,603,612 B2 | | 8/2003 | Nakano | |
| 6,621,631 B2 | | 9/2003 | Lissotshenko et al. | |
| 6,919,039 B2 | * | 7/2005 | Lang et al. | 264/510 |
| 6,954,311 B2 | | 10/2005 | Amanai | |
| 6,997,428 B1 | * | 2/2006 | Andino et al. | 249/134 |
| 7,156,641 B2 | * | 1/2007 | Ansell et al. | 425/215 |
| 7,567,754 B2 | | 7/2009 | Kinoshita | |
| 8,070,475 B2 | * | 12/2011 | Lawton et al. | 425/408 |
| 8,088,313 B2 | * | 1/2012 | Hagmann et al. | 264/1.36 |
| 8,287,269 B2 | * | 10/2012 | Dubey et al. | 425/408 |
| 8,727,757 B2 | * | 5/2014 | Maekawa et al. | 425/89 |
| 2002/0071190 A1 | | 6/2002 | Wada et al. | |
| 2004/0222539 A1 | * | 11/2004 | Hagmann et al. | 264/1.32 |
| 2005/0030647 A1 | | 2/2005 | Amanai | |
| 2005/0057734 A1 | * | 3/2005 | Johannes Stevens et al. | 355/30 |
| 2005/0094260 A1 | | 5/2005 | Tokuda | |
| 2005/0212156 A1 | * | 9/2005 | Tokita et al. | 264/1.36 |
| 2006/0114580 A1 | | 6/2006 | Mori et al. | |
| 2007/0001328 A1 | * | 1/2007 | Kelly | 264/1.32 |
| 2007/0132124 A1 | * | 6/2007 | Dubey et al. | 264/1.32 |
| 2007/0159703 A1 | | 7/2007 | Apel et al. | |
| 2007/0190196 A1 | * | 8/2007 | Bandic et al. | 425/174.4 |
| 2008/0100934 A1 | | 5/2008 | Webster et al. | |
| 2008/0143019 A1 | | 6/2008 | Chou | |
| 2009/0015945 A1 | | 1/2009 | Chen | |
| 2009/0166507 A1 | * | 7/2009 | Lawton et al. | 249/117 |
| 2009/0251800 A1 | | 10/2009 | Iwai | |
| 2010/0295195 A1 | * | 11/2010 | Louh | 264/1.1 |

FOREIGN PATENT DOCUMENTS

| | | |
|---|---|---|
| DE | 19610881 | 1/2008 |
| EP | 0322353 | 6/1989 |
| EP | 0543202 | 5/1993 |
| EP | 1630580 | 3/2006 |
| EP | 1705507 | 9/2006 |
| EP | 1796168 | 6/2007 |
| JP | H02-042568 | 2/1990 |
| JP | 03-218844 | 9/1991 |
| JP | 04161305 | 6/1992 |
| JP | 06059104 | 3/1994 |
| JP | H08-320402 | 12/1996 |
| JP | H09-286038 | 4/1997 |
| JP | 11221842 | 8/1999 |
| JP | 2000227505 | 8/2000 |
| JP | 2001318288 | 11/2001 |
| JP | 2002350605 | 12/2002 |
| JP | 2004029554 | 1/2004 |
| JP | 2004088713 | 3/2004 |
| JP | 2004133073 | 4/2004 |
| JP | 2005018024 | 1/2005 |
| JP | 2005300715 | 10/2005 |
| JP | 2006030894 | 2/2006 |
| JP | 2006267158 | 10/2006 |
| WO | WO 03/004255 | 1/2003 |
| WO | WO-2005003820 | 1/2005 |
| WO | WO-2008059695 | 5/2008 |
| WO | WO-2008146644 | 12/2008 |
| WO | WO 2009/069940 | 6/2009 |
| WO | WO2009/088241 | 7/2009 |
| WO | WO 2009/110883 | 9/2009 |
| WO | WO-2009110883 | 9/2009 |

* cited by examiner

METHOD AND APPARATUS FOR PRODUCING A STRUCTURE, MOLDING TOOL

CROSS-REFERENCE TO RELATED APPLICATIONS

This application is a continuation of copending International Application No. PCT/EP2010/069296, filed Dec. 9, 2010, which is incorporated herein by reference in its entirety, and additionally claims priority from German Application No. 10 2009 055 080.1, filed Dec. 21, 2009, which is also incorporated herein by reference in its entirety.

The present invention relates to a concept for producing a structure of a curable material, for example an optical lens made from a UV polymer.

BACKGROUND OF THE INVENTION

UV replication technology may be used for producing and/or replicating optical and mechanical structures.

In this technology, a UV-curing plastic or polymer, for example Ormocere, UV adhesives by Delo, Norland, Epoxy Technology, Panacol-Elosol, is molded into the desired shape by using a molding tool, and is cured by means of UV radiation, for example. Molding is effected in a mask aligner enabling exact positioning of the molding tool with regard to marks on the substrate on which the molding is to be effected. To perform the curing, the entire surface area of the polymer present on the substrate is irradiated simultaneously with UV radiation through the tool or the substrate and thus is cured.

Since curing is performed in all positions at the same time, the inevitable shrinking will lead to stresses building up which, once the tool has been removed, will be result in shape deviations of the molded structures and in bending of the substrate. If the substrates provided with polymeric structures are to be connected to further substrates, this will result in tolerance-related and procedural problems, such as in the integration of camera objectives at the wafer level.

By way of example, FIG. 19 shows, on the left-hand side, the polymer shrinkage resulting from the UV irradiation and, thus, the shape deviation between the tool and the structure molded, which cannot be accepted specifically for optical applications. The right-hand side of FIG. 19 further shows that in addition to the shape deviation, the polymer shrinkage also leads to tensile stress and a bending of the substrate on which the polymer has been molded.

The publication /1/Jiseok LIM, Minseok CHO, Hokwan KIM, and Shinil KANG: "Fabrication of Hybrid Microoptics Using UV Imprinting Process with Shrinkage Compensation Method", Japanese Journal of Applied Physics, Vol. 47, No. 8, 2008, pp. 6719-6722, shows an adjustable aperture (aperture) for shrinkage compensation in producing hybrid lenses, which represent a combination of spherical glass lenses with an additional polymer film for producing an aspherical profile. The UV irradiation of the polymer is effected through the lens substrate. Variable iris lenses are proposed as aperture layers in this document; however such iris lenses are mechanically complicated and, thus, expensive and have increased installation space requirements.

SUMMARY

According to an embodiment, a molding tool for an optical component may have: a molding face having a surface region for defining an optically relevant surface of the optical component, the molding tool being transparent to irradiation from a side which faces away from the molding face; and a membrane layer arranged on the molding face, said membrane layer loosely abutting the molding face in a channel region of the molding face which is laterally adjacent to the surface region, and being connected, around the channel region, to the molding face in a fluid-tight manner, so that a region between the molding face and the inner surface of the membrane layer forms an expandable channel.

According to another embodiment, an apparatus for producing a structure from curable material by means of molding may have: a molding tool for an optical component, which component may have: a molding face having a surface region for defining an optically relevant surface of the optical component, the molding tool being transparent to irradiation from a side which faces away from the molding face; and a membrane layer arranged on the molding face, said membrane layer loosely abutting the molding face in a channel region of the molding face which is laterally adjacent to the surface region, and being connected, around the channel region, to the molding face in a fluid-tight manner, so that a region between the molding face and the inner surface of the membrane layer forms an expandable channel; an irradiator; an arranger for arranging the molding tool above a surface, so that the curable material adjoins a region between the surface and a molding face of the molding tool which faces the surface, and so that additional curable material may continue to flow into the region; wherein the irradiator is configured to perform locally varying irradiation of the curable material in the region, so that the curable material cures at different speeds in a laterally varying manner and so that shrinkages occurring during curing of the curable material are compensated for by the additional curable material; and an applicator for applying an external pressure to the additional curable material by applying a pressure within the channel of the molding tool.

According to another embodiment, a method of producing a structure from curable material by molding may have the steps of: arranging a molding tool for an optical component, which molding tool may have: a molding face having a surface region for defining an optically relevant surface of the optical component, the molding tool being transparent to irradiation from a side which faces away from the molding face; and a membrane layer arranged on the molding face, said membrane layer loosely abutting the molding face in a channel region of the molding face which is laterally adjacent to the surface region, and being connected, around the channel region, to the molding face in a fluid-tight manner, so that a region between the molding face and the inner surface of the membrane layer forms an expandable channel, above a surface, so that in a first region between the molding tool and the surface, the curable material adjoins the surface and a molding face of the molding tool which faces the surface, and so that additional curable material may continue to flow into the first region; irradiating the curable material in the region in a locally varying manner, so that the curable material cures at different speeds in a laterally varying manner, and such that shrinkages occurring during curing of the curable material are compensated for by the additional curable material; and applying an external pressure to the additional curable material during irradiation by applying a pressure within the channel of the molding tool.

A first aspect of the present invention is that improved compensation for shrinkage of the curable material is made possible if irradiation of a curable material is performed in a locally varying manner in an area of a molding tool so that the curable material cures at different speeds in a laterally varying manner, and so that shrinkages occurring during curing of the curable material may be readily compensated for by additional curable material, a constant pressure being applied to the additional curable material.

An advantage of the present invention is that by applying an external pressure to the additional curable material, which pressure is additional to a force influencing the additional curable material which results from a surface tension of the curable material and/or the additional curable material and an interface between same and the molding tool, improved continued flow of the additional curable material is enabled and, thus, improved compensation for the shrinkages of the curable material is enabled, and improved optical properties of the molded part are obtained.

A further aspect of the present invention is that improved compensation for material shrinkage of a curable material may be achieved if irradiation of the curable material is performed in a locally varying manner in an area of a molding tool through the molding tool so that the material cures at different speeds in a laterally varying manner, and so that shrinkages occurring during curing of the curable material may be readily compensated for by additional curable material.

Due to irradiation through the molding tool, that part of the curable material that adjoins a molding face of the molding tool is cured first, so that there, the optical properties of the molded part which comes into being are undisturbed. In addition, the distances the continually flowing additional curable material covers are reduced, whereby the optical properties of the molded part are improved further.

Embodiments of a molding tool in accordance with the present invention enables locally varying irradiation in a simple manner, since irradiation from above through the molding tool is possible.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
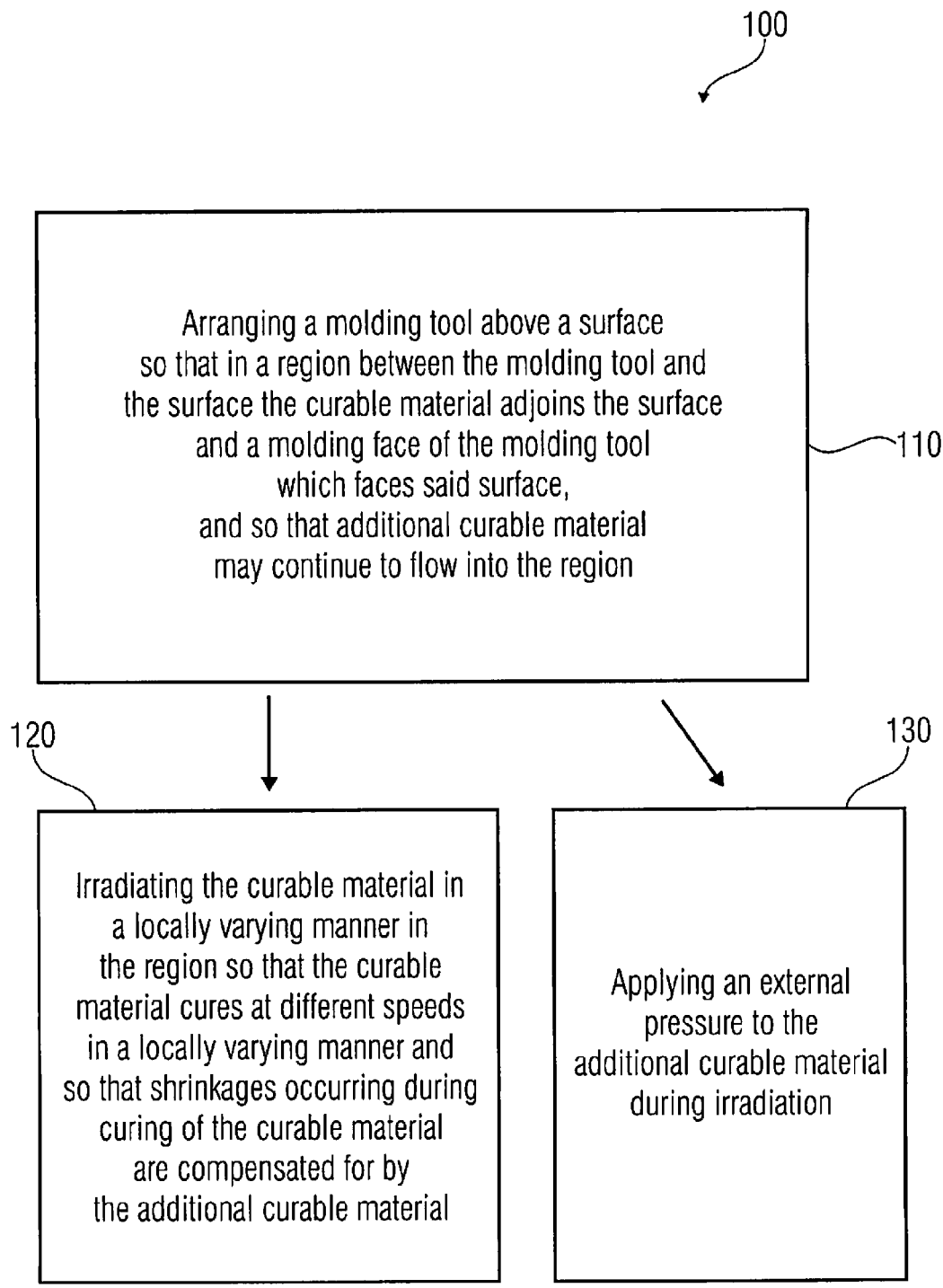
FIG. 1 shows a flow chart of a method in accordance with an embodiment of the present invention.

Before the present invention will be explained in more detail below with reference to the figures, it shall be noted that identical elements have been provided with identical or similar references and that repeated descriptions of said elements have been omitted.

The methods described below by means of FIGS. 1 and 2 may be performed, for example, by using apparatus as will be described by means of FIGS. 3 to 18 following the description of the methods. In particular, the reference numerals used in the descriptions of the methods relate to the apparatus described subsequently.

FIG. 1 shows a flow chart of a method 100 in accordance with an embodiment of the present invention. The method 100 of producing a structure from curable material by molding includes a first step 110 of arranging a molding tool 310 on a surface 330, for example a glass substrate, so that in a region 340 between the molding tool 310 and the surface 330, the curable material 320, for example a UV polymer, adjoins the surface 330 and a molding face 312 of the molding tool 310 which faces the surface 330 and so that additional curable material 321 may continue to flow into the region 340. In addition, the method 100 includes a second step 120 of irradiating the curable material 320 in a locally varying manner in the region 340, so that the curable material 320 cures at different speeds in a laterally varying manner, and so that shrinkages occurring during curing of the curable material 320 may be readily compensated for by the additional curable material 321. In addition, the method 100 includes a third step 130 of applying an external, or outer, pressure to the additional curable material, it being possible to perform said third step 230 simultaneously with the second step 220.

The curable material will also be referred to as polymer, UV polymer or UV-curing plastic in the following.

Figure 2:
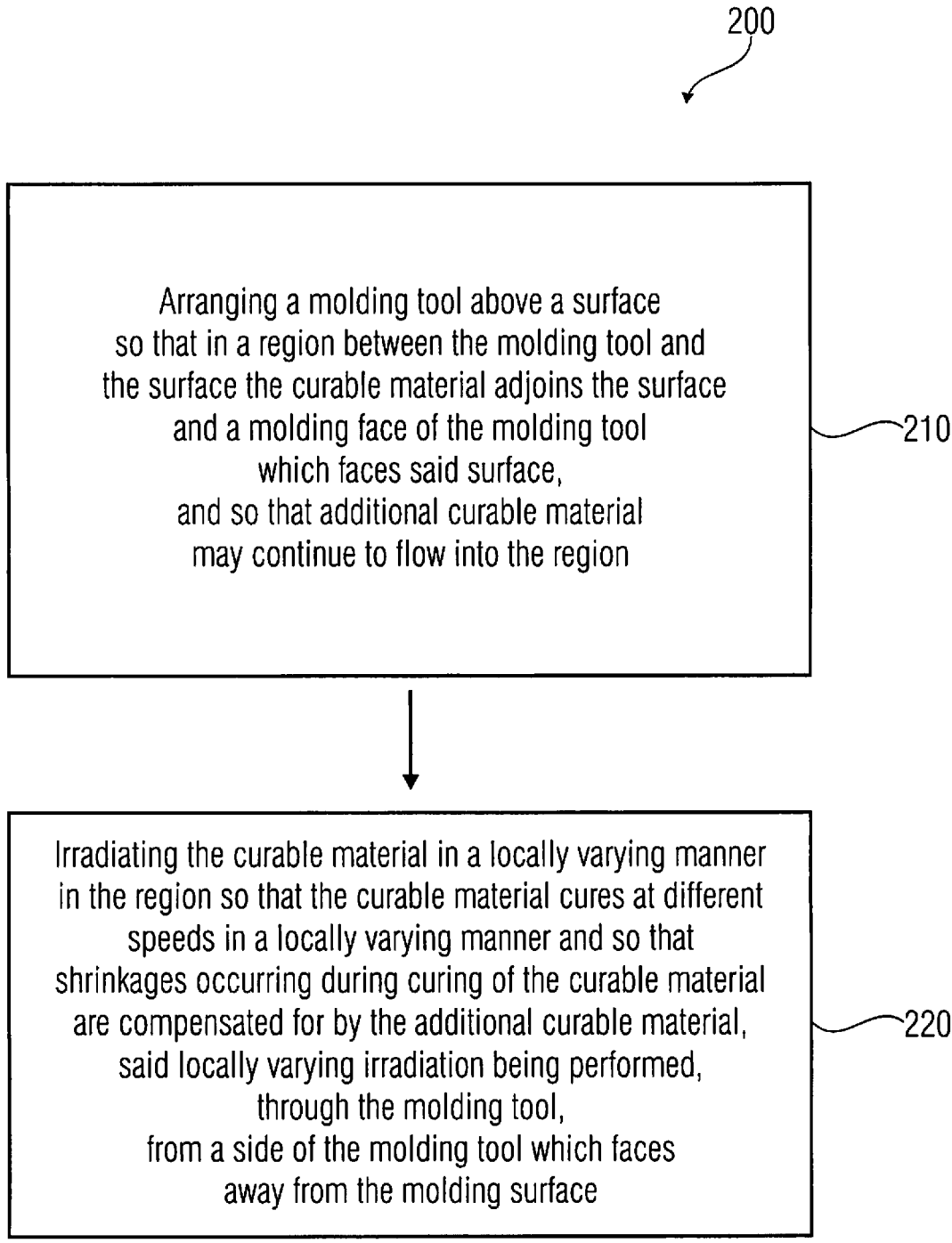
FIG. 2 shows a flow chart of a method in accordance with an embodiment of the present invention.

FIG. 2 shows a flow chart of a method 200 in accordance with an embodiment of the present invention. The method 200 of producing a structure from curable material by molding includes a first step 210 of arranging a molding tool 310 on a surface 330, for example a glass substrate, so that in a region 340 between the molding tool 310 and the surface 330, the curable material 320, for example a UV polymer, adjoins the surface 330 and a molding face 312 of the molding tool 310 which faces the surface 330 and so that additional curable material 321 may continue to flow into the region 340. In addition, the method 200 includes a second step 220 of irradiating the curable material 320 in a locally varying manner in the region, so that the curable material 320 cures at different speeds in a laterally varying manner, and so that shrinkages occurring during curing of the curable material 320 may be readily compensated for by the additional curable material 321, said locally varying irradiation being performed, through the molding tool, from that side of the molding tool 310 which faces away from the surface 330. The molding tool 310 may be produced from a transparent material, for example glass, silicone or transparent plastic.

Figure 3:
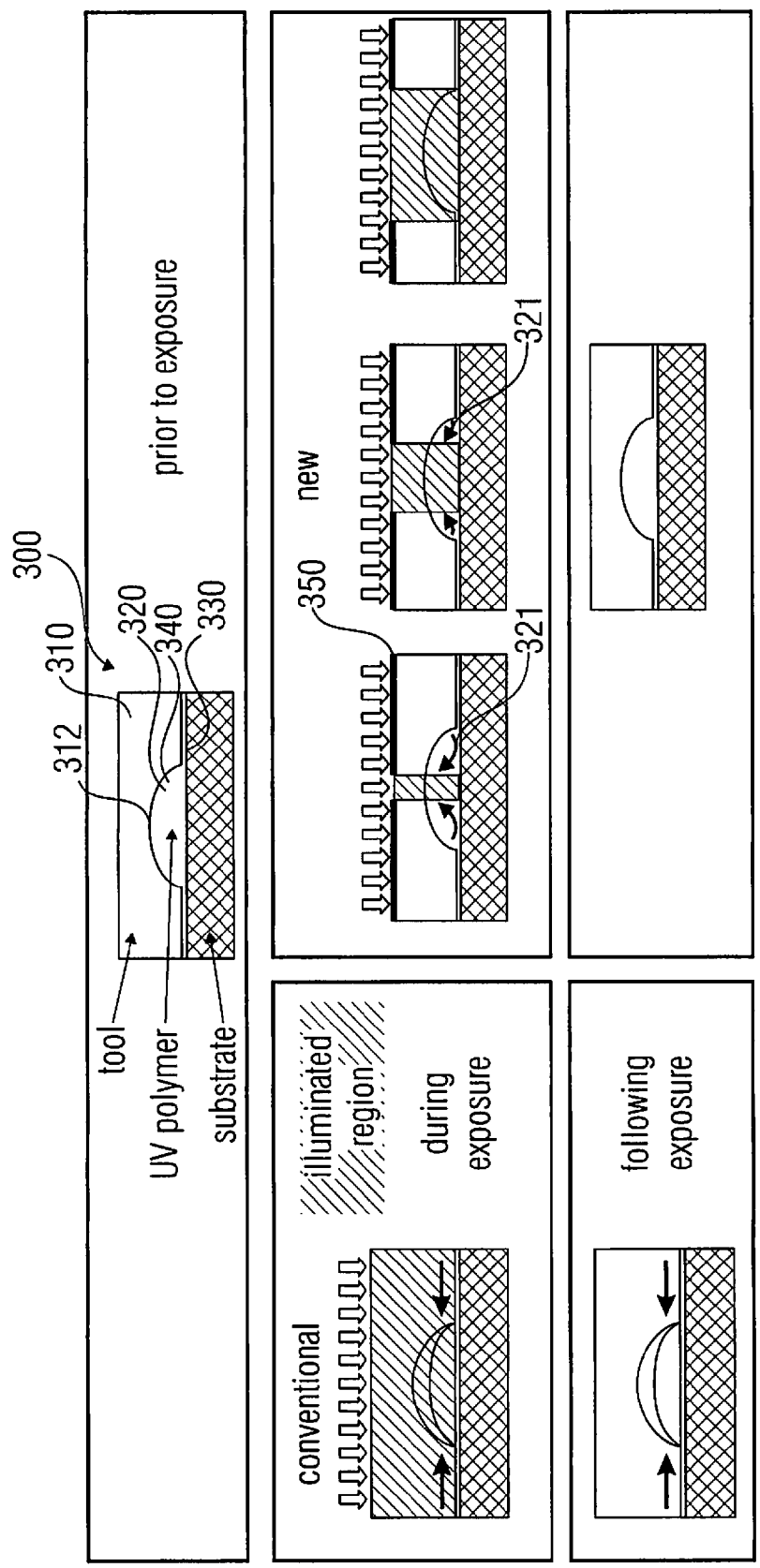
FIG. 3 a drawing of a comparison of a known production method of conventional technology with a method in accordance with an embodiment of the present invention.

FIG. 3 shows a drawing of a comparison of a known production method of conventional technology with a method in accordance with an embodiment of the present invention, the right-hand side depicting a schematic representation of an apparatus 300 in accordance with an embodiment of the present invention, and the left-hand side depicting, as a comparative example, an apparatus for producing a structure from curable material by means of molding, said apparatus already being known from conventional technology. The apparatus 300 includes a molding tool 310, for example made of a transparent material, a surface 330, for example made of a glass substrate, a curable material 320, for example a UV polymer, which is arranged between a molding face 312 of the molding tool 310 and the surface 330 in a region 340. In contrast to the already known apparatus depicted on the left-hand side, the apparatus 300 depicted on the right-hand side additionally includes an aperture field 350 which is arranged on a surface of the molding tool 310 which faces away from the surface 330.

In the apparatus which is shown on the left-hand side of FIG. 3 and is already known, the entire region of the curable material is simultaneously irradiated with UV radiation through the molding tool. The UV curing material will shrink during said irradiation, so that shape deviations will arise between the molding tool of the apparatus already known and the molded structure. In contrast thereto, the apparatus 300 enables temporal control of the transmission function of the illumination optics, i.e., exposure to UV radiation is not effected—as in the example shown on the left-hand side—as floodlighting across the entire wafer and/or the entire curable material 320 at the same time, but is effected through an aperture variable in terms of its diameter (e.g., iris aperture or LCD display) or through a field of apertures 350. Thus, the apparatus 300 performs locally varying irradiation of the curable material 320 in the region 340, so that the curable material 320 cures at different speeds in a locally varying manner, and so that shrinkages occurring during curing of the curable material 320 may be readily compensated for by additional curable material 321.

In other words, on its right-hand side, FIG. 3 shows, by way of example, step 120 of locally varying irradiation, the curable material 320 in this case firstly being irradiated in a central manner and then, in a time-offset manner, over the entire region through the tool 310. In this matter, the curable material 320 and/or the polymer is cured only locally rather than being exposed to UV rays, since polymer and/or additional curable material 321 which is shielded off from the aperture or aperture layer 350 and is therefore still liquid may continue to flow and may compensate for any shrinkage of the material 320 and/or polymer which has already been cured.

Thus, the variable aperture and/or aperture layer 350 ensures temporally variable local control of the amplitude of the transmission function.

Figure 4:
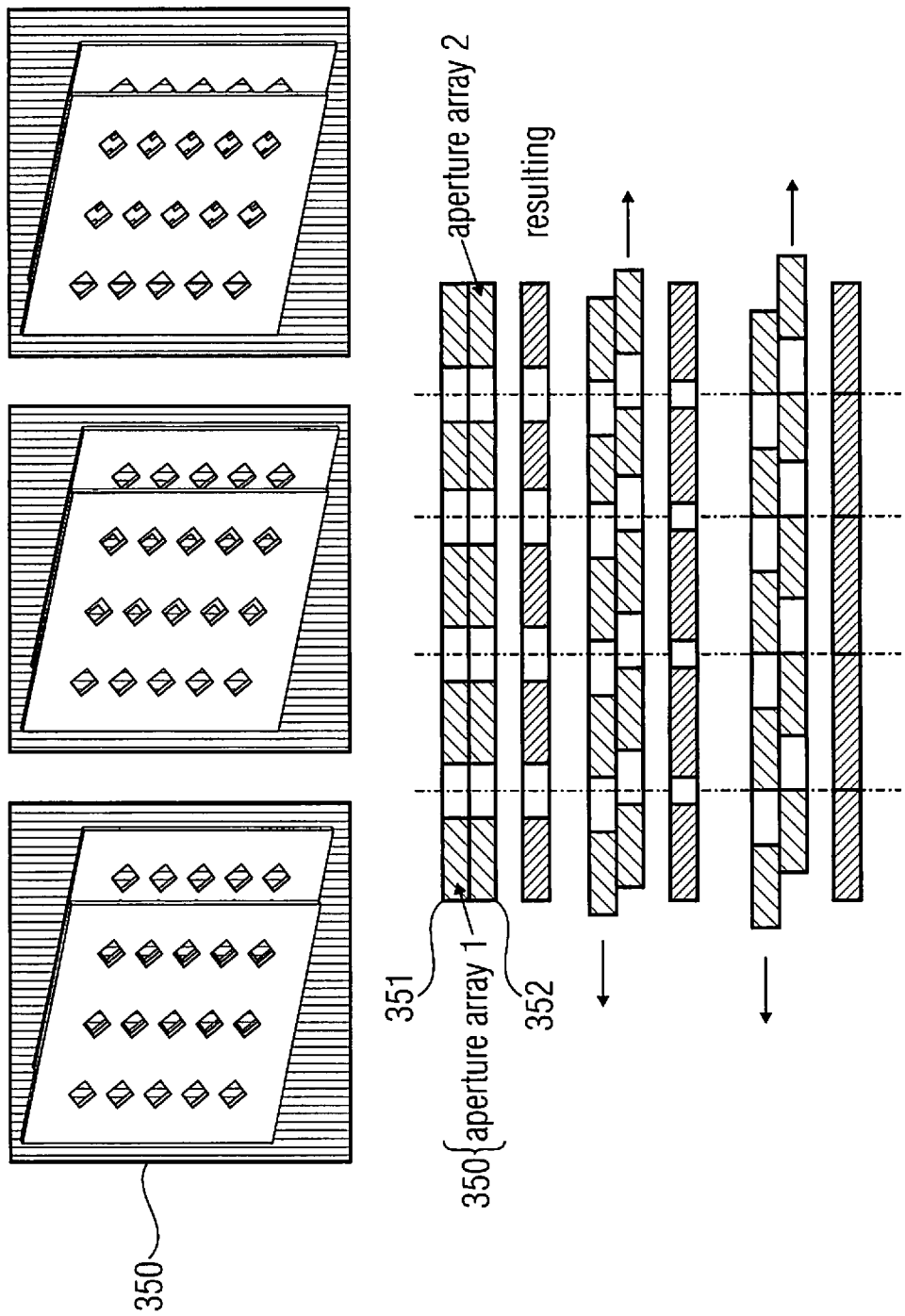
FIG. 4 shows a drawing of an exemplary aperture structure for utilization in an embodiment of the present invention.

FIG. 4 shows a schematic representation of an exemplary aperture layer 350 for utilization in an embodiment in accordance with the present invention. A simple arrangement for variable field-like aperture structures and/or an aperture layer 350 results from combining two aperture fields 351 and 352 with fixed individual apertures. By shifting the aperture fields 351 and 352 in relation to each other, individual apertures will result which are simultaneously variable in terms of their sizes. The individual apertures may have simple rectangular or round openings, for example. The distance of the apertures and/or the individual apertures corresponds to the distance or to a multiple of the distance of the structures and/or lenses to be produced, when producing a plurality and/or a field of structures. If both aperture fields 351 and 352 are shifted by the same travel but in opposite directions, what will result is the effect of an aperture field 350 which remains in its place and comprises variable sizes of the individual apertures. In the bottom part, FIG. 4 shows the above-described mode of operation in a schematic manner. Unlike other aperture structures, such as an iris aperture or an LCD display, for example, the aperture layer 350 shown can be produced at low cost. Fields of variable iris apertures are mechanically complicated and, thus, expensive and have increased installation space requirements. The aperture structure 350 proposed thus also enables low-cost production of field arrangements of structures.

Figure 5:
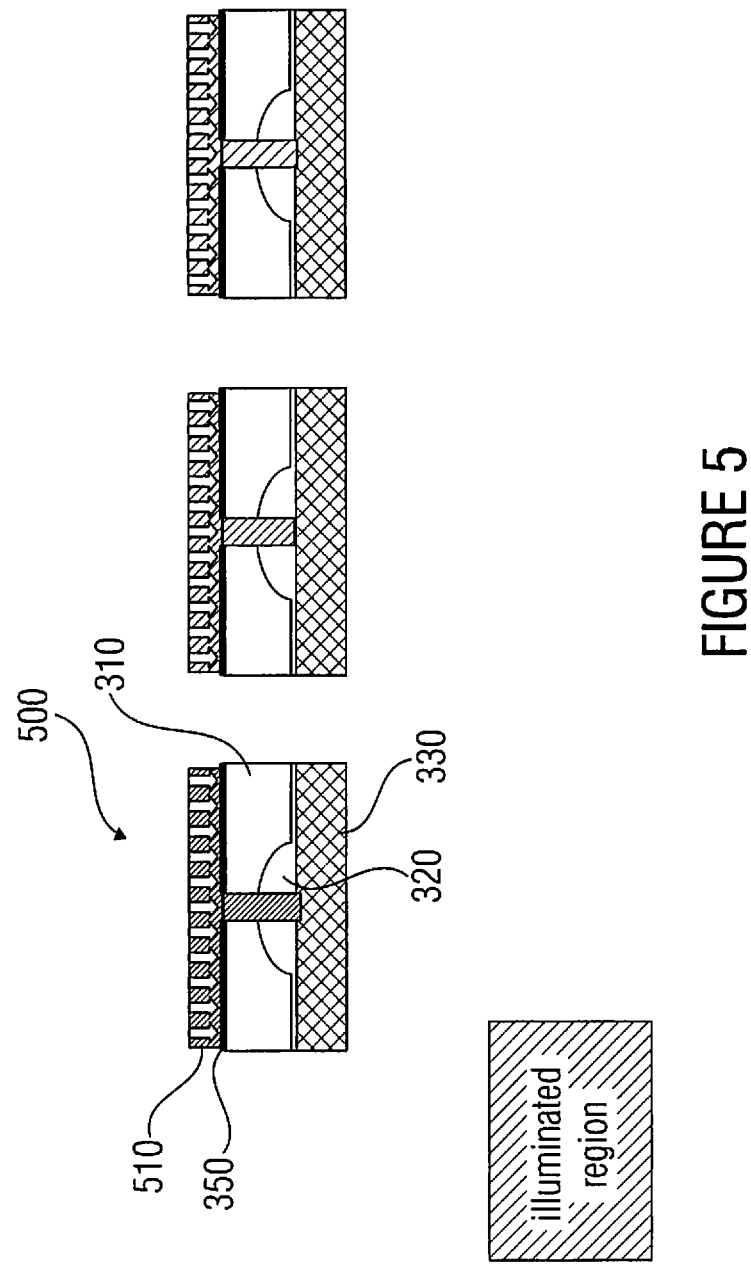
FIG. 5 shows a schematic representation of an apparatus in accordance with an embodiment of the present invention.

FIG. 5 shows an apparatus 500 in accordance with an embodiment of the present invention. Unlike the apparatus 300, the apparatus 500 includes a variable grey filter 510 in addition to the aperture and/or aperture layer 350 adjustable in terms of its diameter. The grey filter 510 may be arranged, for example, on a surface of the aperture layer 350 which faces away from the molding tool 310.

The variable grey filter 510 may additionally influence the amplitude of the transmission function; this enables adaptation of the curing rate of the polymer and/or of the curable material 320. Instead of a gray filter 510, a liquid crystal arrangement may also be utilized, in principle, for controlling the amplitude of the transmission function, or any other arrangement enabling controlling of the amplitude of the transmission function may be utilized.

Controlling the amplitude of the transmission function would basically also be possible by adapting the illumination power of the UV radiation source; however, since mask aligners are to be employed, this functionality does not exist in most cases since the illumination power is fixed in this case.

Figure 6A:
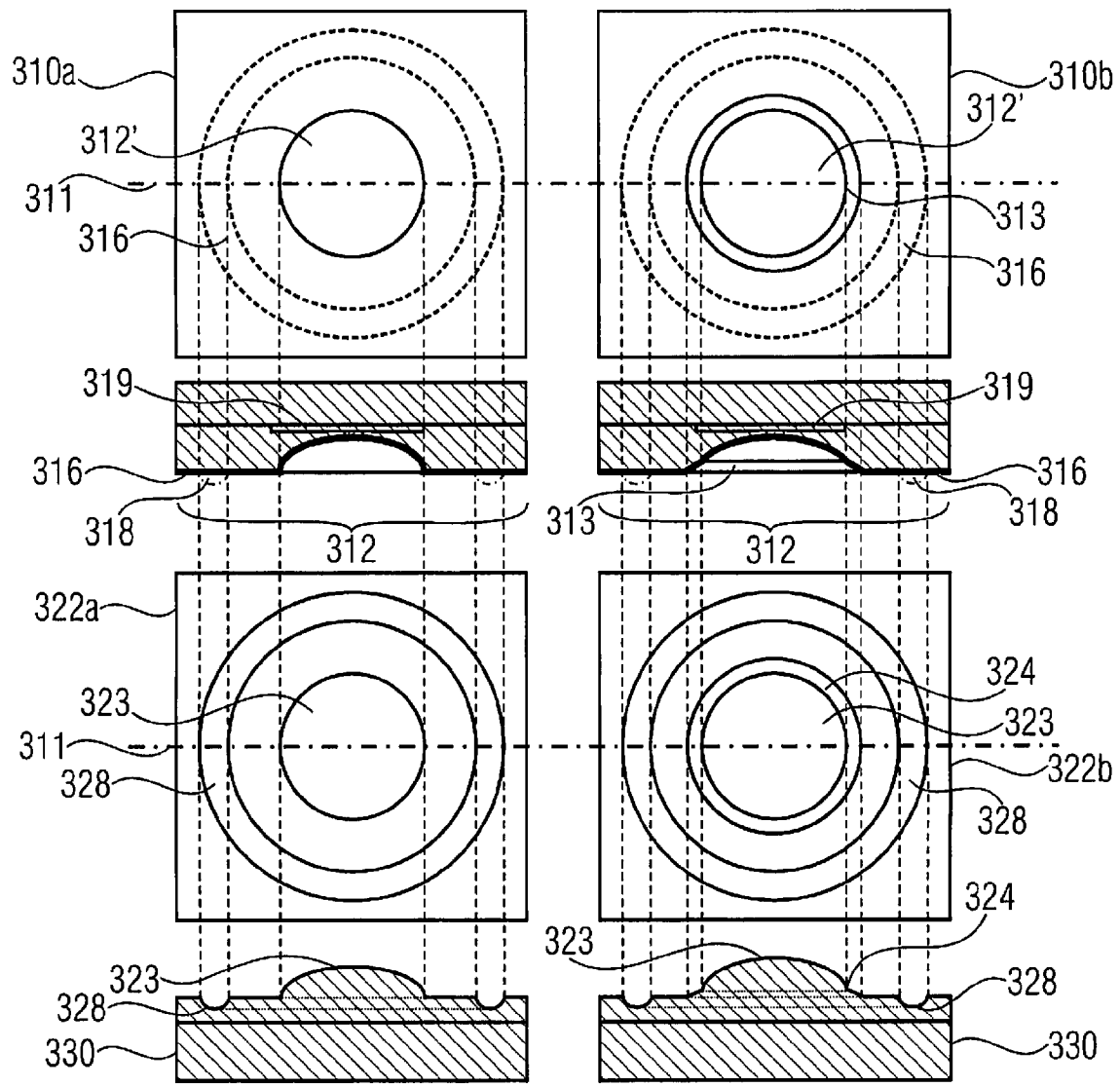
FIGS. 6a-6c show partial views and sectional views of molding tools in accordance with embodiments of the present invention and of molded elements.

On its left-hand side, FIG. 6a shows a bottom view of a molding tool 310a in accordance with an embodiment of the present invention and a sectional view of the molding tool 310a as well as a top view of an element 322a molded by the molding tool 310a, and a sectional view of the molded element 322a. In addition, on the right-hand side, FIG. 6a shows a bottom view of a molding tool 310b and a sectional view of the molding tool 310b as well as a top view of an element 322b molded by the molding tool 310b, and a sectional view of the molded element 322b.

Figure 6B:
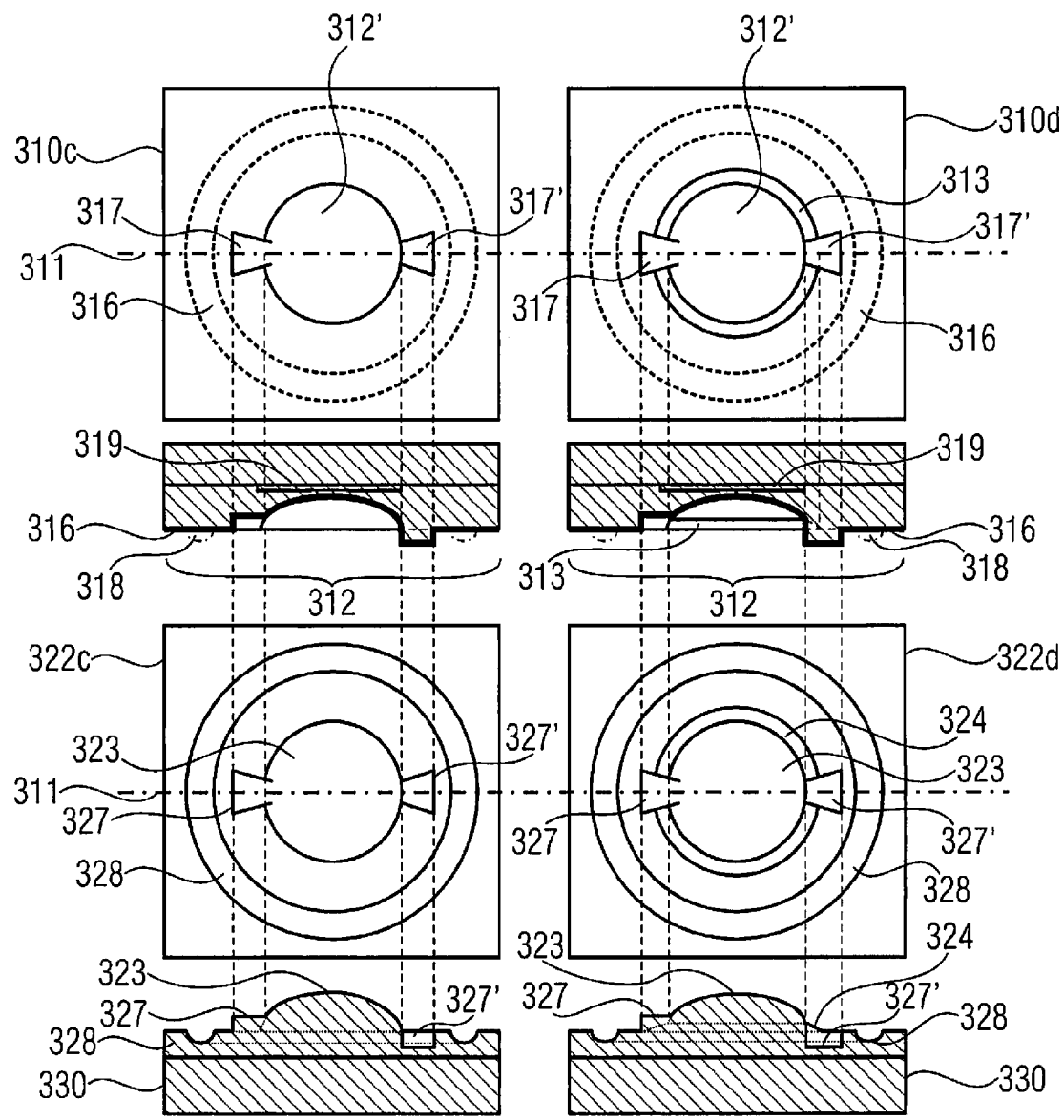
Figure 6C:
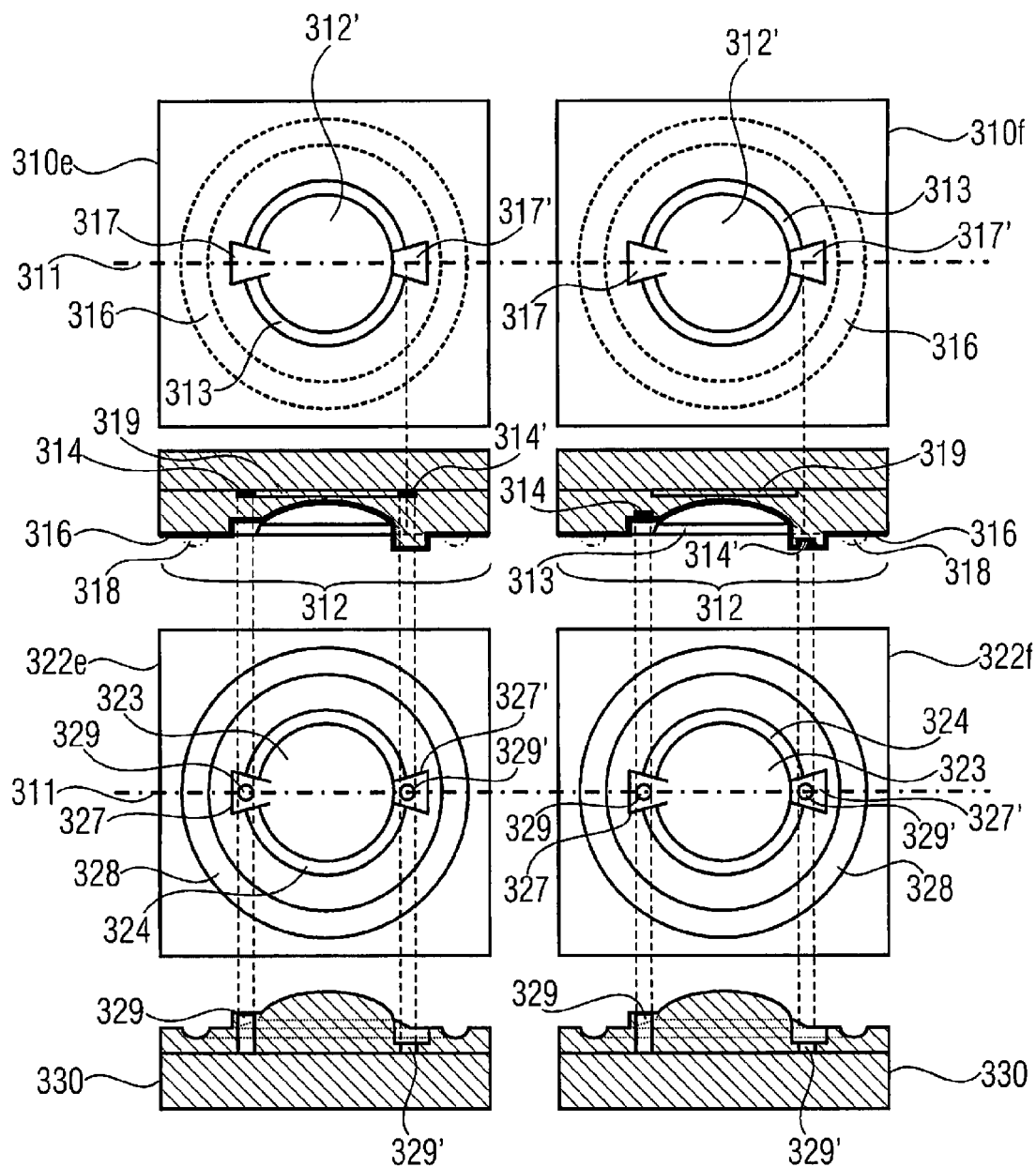

The sectional views of the molding tools and molded elements shown in FIGS. 6a to 6c have resulted from a section through the molding tools and/or the molded elements along a sectional axis 311.

The molding tool 310a shown in FIG. 6a comprises a molding face 312 having an optical functional face region 312'. The molding face 312 faces the surface 330 when the molding tool 310a is placed upon a surface 330 or is arranged above same. In addition, the molding tool 310a comprises a circumferential elastic membrane 316 on the molding face 312. In the present case, the elastic membrane 316 fully covers the molding face 312 by way of example, even though partial coverage would also be possible, and in a circumferential region, which forms a laterally closed path around the optical functional face region 312', said elastic membrane 316 is non-adhesive but connected to the molding face 312 at the borders of the circumferential region. Thus, it is possible to introduce a fluid such as air or oil, for example, between the molding face 312 and the inner surface of the elastic membrane 316 without said fluid coming into contact with the curable material 320. Thus, the region which is provided with the fluid and is located between the molding face 312 and the inner surface of the elastic membrane 316 forms a channel 318 which, when the molding tool 310a is placed upon the surface 330 or is aligned at a distance from same, will bulge out in the direction of the surface 330 so as to displace any curable material located there which has not yet been cured, and to thus increase the pressure of the latter material. Moreover, the molding tool 310a comprises a structure 319 serving the purpose of locally controllable divergence adaptation.

In particular, the surface 330 may be a surface of a substrate onto which the molding tool 310 is placed or is aligned at a distance from same; therefore, the surface 330 will also be referred to as a substrate 330 in the following. However, it should also be pointed out that in accordance with further embodiments, the surface 330 may also be an optically relevant surface of an already molded structure. This may be the case in particular in the production of optical layer stacks, by superimposed molding of several structures of curable materials.

The optical functional face 312' serves to define an optically relevant surface 323 of the element 322a molded on a substrate 330, or on the surface 330.

The channel 318, which is created by the membrane 316 which is pressurized during a molding and curing step, leaves a circumferential trench 328 within the molded element 322a; however, it is not necessary to pay particular attention to said trench 328.

Applying a pressure within the elastic membrane 316 and, thus, creating the channel 318 results, during the molding and curing step, in continuous flowing of additional curable material into the region of the optically relevant surface 323 of the molded element 322a to compensate for any shrinkage of the polymer volume during the curing. The structure 319 for adapting divergence serves to provide uncollimated irradiation so as to avoid any striation specifically in the region in and below the optically relevant surface 323 of the molded element 323a. The structure 319 for adapting divergence may be a microlens field, a diffractive structure, a diffuser or an application of colors and pigments which achieve the same effect as the first-mentioned micro structures, but are simply printed on instead of having to be microstructured, which involves a large amount of effort.

The molding tool 310b shown on the right-hand side in FIG. 6a differs from the molding tool 310a shown on the left-hand side by an additional mechanical functional face 313 encircling the optical functional face 312'. Accordingly, the molded element 322b has a mechanical functional edge 324 encircling the optically relevant surface 323. Said mechanical functional edge 324, for example, cannot serve to perform the optical function of the molded element 322b and thus cannot be located in the region of the uncollimated radiation created by the structure 319 for adapting divergence. The optical functional edge 324 may serve, for example, to adjust and/or lock the molded element 322b when several molded elements are stacked one above the other.

On its left-hand side, FIG. 6b shows a bottom view of a molding tool 310c in accordance with an embodiment of the present invention and a sectional view of the molding tool 310c as well as a top view of an element 322c molded by the molding tool 310c and a sectional view of the molded element 322c. In addition, FIG. 6b shows, on its right-hand side, a bottom view of a molding tool 310d in accordance with an embodiment of the present invention and a sectional view of the molding tool 310d as well as a top view of the element 322d molded by the molding tool 310d, and a sectional view of the molded element 322d.

The molding tool 310c shown on the left-hand side of FIG. 6b differs from the molding tool 310a shown on the left-hand side of FIG. 6a in that it comprises peripheral, non-rotationally symmetric structures 317, 317' adjacent to the optical functional face 312'. A first peripheral, non-rotationally symmetric structure 317 forms a depression in the molding face 312 of the molding tool 310c. A second peripheral, non-rotationally symmetric structure 317' forms an elevation in the molding face 312 of the molding tool 310c. In the molded element 322c, the first peripheral, non-rotationally symmetric structure 317 leads to a peripheral, non-rotationally symmetric elevation 327 adjacent to the optically relevant surface 323. In the molded element 322c, the second peripheral, non-rotationally symmetric structure 317' of the molding tool 310c leads to a peripheral, non-rotationally symmetric depression 327'.

In particular when several molded elements are stacked one upon the other, the elevation 327 and depression 327' created by the peripheral, non-rotationally symmetric structures 317, 317' may serve to lock said individual elements.

Even though the structures 317, 317' are not rotationally symmetrical in the above embodiment, in further embodiments the structures 317, 317' may also be rotationally symmetric and/or rotationally invariant in relation to partial revolutions, or be encircling. In addition, it is possible for the molding tool 310c to have only one peripheral structure or any number of peripheral structures. Said structures may vary in terms of their shapes and, in particular, in terms of their directions of implementation in relation to a surface 330 onto which the molding tool 310c may be placed and/or aligned to the surface 330 at a distance from same.

The molding tool 310d shown on the right-hand side in FIG. 6b differs from the molding tool 310d shown on the left-hand side in FIG. 6b by an enclosing mechanical functional face 313, which adjoins the optical functional face 312' and which is adjoined by the peripheral, non-rotationally symmetric structures 317, 317' so as to extend radially outward.

In the molded element 322d, the mechanical functional face 313 leads to a circumferential mechanical border 324 from which the elevation 327 and the depression 327' extend.

On its left-hand side, FIG. 6c shows a bottom view of a molding tool 310e in accordance with an embodiment of the present invention and a sectional view of the molding tool 310e as well as a top view of an element 322e molded by the molding tool 310e, and a sectional view of the molded element 322e. Furthermore, on its right-hand side, FIG. 6c shows a bottom view of a molding tool 310f in accordance with an embodiment of the present invention and a sectional view of the molding tool 310f as well as a top view of an element 322f molded by the molding tool 310f, and a sectional view of the molded element 322f.

The molding tool 310e shown on the left-hand side in FIG. 6c differs from the molding tool 310d shown on the right-hand side in FIG. 6b in that a first aperture structure 314 and a second aperture structure 314' are arranged laterally adjacent to the optical functional face region 312'.

The aperture structures 314, 314' serve to shield off any regions which are not to be cured during irradiation through the molding tool 310e.

Thus, the aperture structures 314, 314' in the molded element 322e lead to a first channel 329 extending perpendicularly to the surface 330, and to a second channel 329' extending perpendicularly to the surface 330, both channels not having any cured material arranged therein following a cleaning process and/or developing process. For example, the channels 329, 329' may be utilized for introducing a solvent, for solving soluble curable material so as to create air spaces.

The molding tool 310f shown on the right-hand side in FIG. 6c differs from the molding tool 310e shown on the left-hand side by different placements of the aperture structures 314, 314'. The first aperture structure 314 is arranged in the first peripheral, non-rotationally symmetric structure 317 of the molding tool 310f. The second aperture structure 314' is arranged in the second peripheral, non-rotationally symmetric structure 317' of the molding tool 310f. The aperture structures 314, 314' may be realized in a particularly simple manner, for example by applying black color to the molding face 312 or to the elastic membrane 316 in the regions of the peripheral, non-rotationally symmetric structures 317, 317'.

The element 322f molded by the molding tool 310f does not differ from the molded element 322e.

Even though the molding tools 310a to 310f described in FIGS. 6a to 6c serve to produce molded elements 322a to 322f having convex optically relevant surfaces 323, further embodiments may comprise molding tools configured to mold molded elements having concave, convex, planar or even freeform-area-like optically relevant surfaces.

The molded elements 323a to 323f shown in FIGS. 6a to 6c may form optical lenses, for example. Even though a plano-convex lens shape is represented in the embodiments depicted, it is also possible for molded elements to have any other lens shapes in further embodiments.

Even though in the embodiments shown above, two aperture structures 314, 314' are arranged, it is also possible for molding tools to comprise one aperture structure or any number of aperture structures or no aperture structures at all.

Even though in the embodiments shown above, the aperture structures 314, 314' are arranged, by way of example, such that the channels 329, 329' extending perpendicularly to the surface 330 form in a lateral manner in the region of the peripheral, non-rotationally symmetric structures 327, 327', it would also be possible for the aperture structures 314, 314' to be arranged at different positions within the molding tools 310e, 310f, for example outside the optical functional face region 312', so as to form the channels—which extend perpendicularly to the surface 330—at other locations within the molded elements 322e, 322f.

In addition, in further embodiments the substrate or the surface 330 may not be planar but have any shape, for example as a counterpart to the molding tools 310a to 310f.

The molded elements 322a to 322f represent highly precise negative images of the molding tools 310a to 310f.

Thus, the aperture structures 314, 314' may serve to shield off the liquid polymer and/or additional curable material during irradiation with UV light for creating cavities and/or channels 329, 329', which extend perpendicularly to the substrate or the surface 330, within the molded elements 322e to 322f. Following curing by UV irradiation while utilizing step 120, cavities and/or channels 329, 329', which extend perpendicularly to the substrate or surface 320, will remain within the produced structure and/or the molded elements 322e to 322f after a subsequent cleaning step for removing non-irradiated and, thus, liquid polymer and/or curable material.

Moreover, a further step may comprise removing the surface 330 or the substrate 330 or molding a further element on an already molded element.

In accordance with further embodiments, molding tools may additionally comprise aperture structures for storing up polymer volume which is not being cured, since as a consequence of the shrinkage, during curing of the polymer, by about 1 to 10%, for example, there may be a larger volume of liquid polymer and/or curable material than of cured material that will be present later on.

Consequently, aperture structures for storing up polymer volume are provided in order to prevent irradiation and, thus, curing by UV radiation. The liquid polymer and/or additional curable material that exists below the aperture structures for storing up polymer volume thus serves, for example, as a reservoir of the necessitated additional volume of liquid polymer and/or curable material for shrinkage compensation.

The aperture structures for storing up polymer volume may be combined, for example, together with the aperture structures for providing channels, which extend perpendicularly to the surface, to form one common (shared) aperture structure or several common aperture structures.

Aperture structures for storing up polymer volume may be dispensed with, for example (as is shown for molding tools 310e, 310f), if for storing up the liquid polymer all of the regions outside an optical functional face region of a molding tool are utilized, and if irradiation is performed, in a temporally sequential manner, from the inside (starting with the optical functional face region) to the outside, the regions outside the optical functional face region cannot be covered since due to the temporally sequential irradiation, irradiation is not performed until after irradiation of the optical functional face region.

Figure 7:
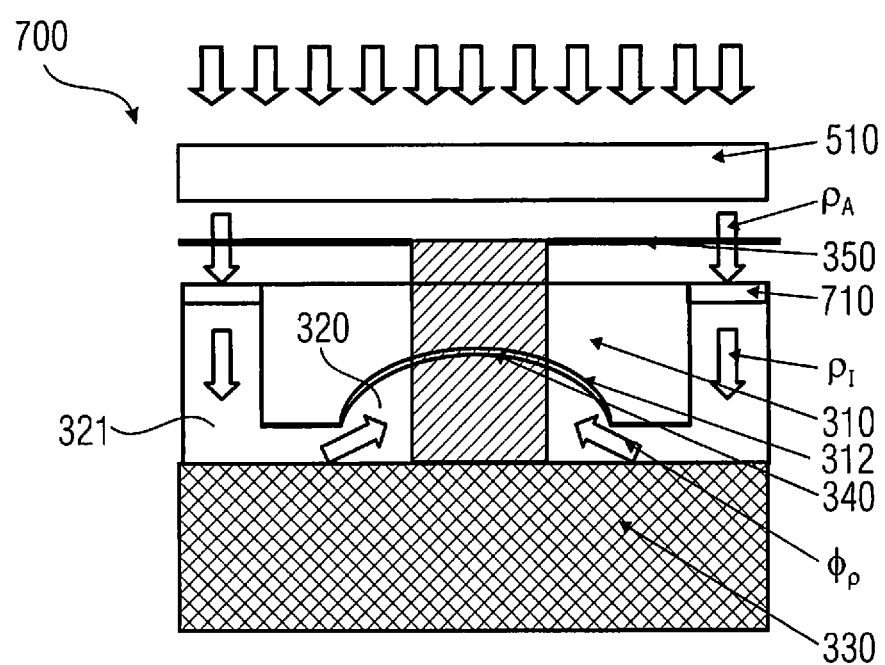
FIG. 7 shows a schematic representation of a sectional view of an apparatus in accordance with an embodiment of the present invention.

FIG. 7 shows a schematic representation of a sectional view of an apparatus 700 in accordance with an embodiment of the present invention. The apparatus 700 includes a surface 330, for example made of a glass substrate material. On the surface 330, a molding tool 310 is arranged such that curable material 320 may be located between a molding face 312, which faces the surface 320, in a region 340. In addition, the molding tool 310 is surrounded by additional curable material 321. On its outer edge, the molding tool 310 comprises a circumferential elastic membrane 710. On a surface of the molding tool 310 which does not face the surface 330, the apparatus 700 comprises a variable aperture layer 350. The aperture layer 350 is adjoined by a variable grey filter 510. Moreover, a circumferential seal, for example made of an elastic material, may be arranged on the edge of the apparatus 700.

The apparatus 700 shown in FIG. 7 enables application of a static pressure $p_a$ to the liquid polymer and/or the additional curable material 321. That is, an outer static pressure $p_a$ may be applied to the elastic membrane 710 by a stamp, for example, which results in an inner static pressure $p_i$ in the region sealed off by the elastic membrane 710 and the circumferential seal. The inner pressure $p_i$ leads to an improvement of the transport and/or the flow $\phi_P$ of the liquid polymer and/or additional curable material 321 to the locations, which are locally restricted by the variable apertures and/or aperture layers 350, of the curing of the polymer that is taking place, so as to achieve improved shrinkage compensation.

In other words, the molding tool 310 has openings via which a pressure $p_a$ may be applied, e.g. by a stamp, to the liquid polymer and/or additional curable material 321 from outside. The outer static pressure $p_a$ may advantageously be transferred to the liquid polymer and/or additional curable material 321 via the elastic membrane 710, which is made of PDMS—polydimethyl siloxane, via a stamp and/or by utilizing hydraulic or pneumatic mimesis. At the same time, a contact to the outside may be prevented by the elastic membrane 710. The circumferential seal, for example made of an elastic material, on the edge of the apparatus 700 and/or the waver serves to maintain the pressure. To ensure the transport or flow of the liquid polymer $\phi_P$ at all locations within the seal, the entire surface of the wafer or of the apparatus 700 is provided with a continuous layer of liquid polymer or curable material, and thus forms, from a hydrodynamic point of view, corresponding pipes and thus has the same inner static pressure $p_i$.

In this manner, the apparatus 700 enables the step 130 of applying a constant pressure to the additional curable material 321 to be performed at the same time as the step of locally varying irradiation 120. This ensures that any cavities that have developed during the curing of the curable material are compensated for by additional curable material 321 which continues to flow, and that, consequently, improved shrinkage compensation is achieved.

Figure 8:
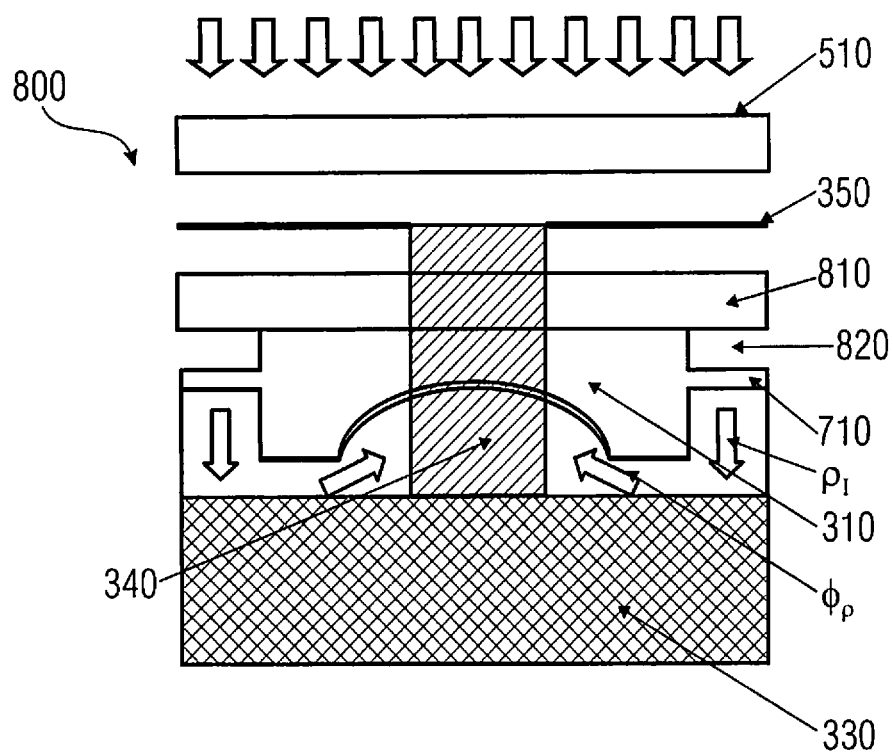
FIG. 8 shows a schematic representation of a sectional view of an apparatus in accordance with an embodiment of the present invention.

FIG. 8 shows a schematic representation of a sectional view of an apparatus 800 in accordance with an embodiment of the present invention. The apparatus 800 differs from the apparatus 700 in that a tool substrate 810 is arranged between that side of the molding tool 310 which faces away from the surface 330 and that surface of the aperture layer 350 which faces the molding tool 310. The tool substrate 810 in the form of a planar plate adjoins that surface of the molding tool 310 which faces away from the surface 330. In addition, the apparatus 800 comprises, between the tool substrate 810 and the molding tool 310 on the outer edges of the molding tool 310, a channel 820 for hydraulics and/or compressed air for applying pressure.

In contrast to the apparatus 700, in the apparatus 800 described here, the outer static pressure $p_a$ is produced by hydraulics and/or compressed air within the channel 820 rather than by a stamp.

Figure 9:
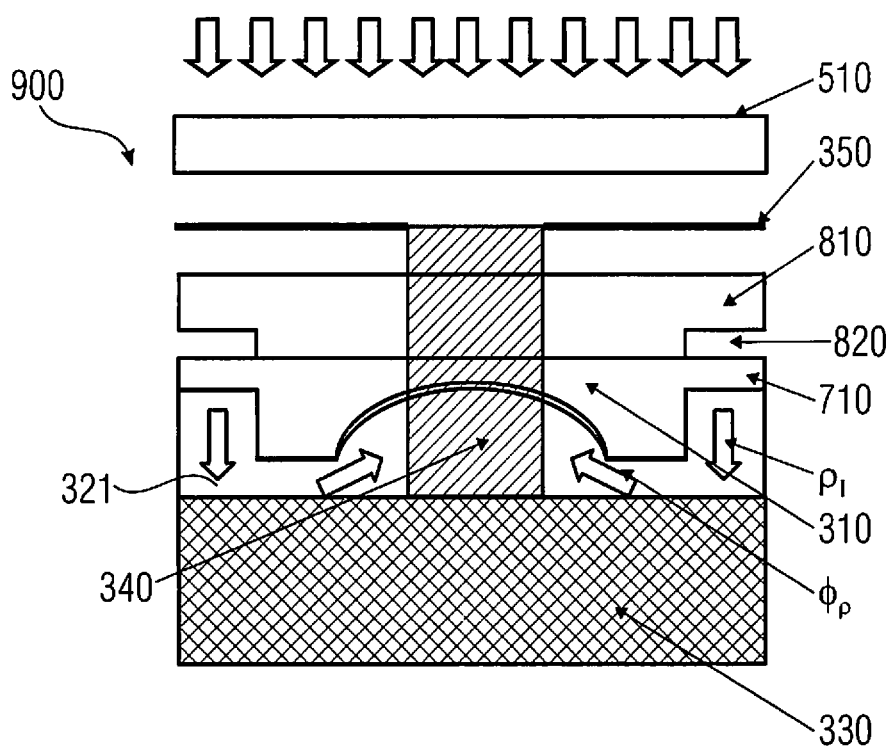
FIG. 9 shows a schematic representation of a sectional view of an apparatus in accordance with an embodiment of the present invention.

FIG. 9 shows a schematic representation of a sectional view of an apparatus 900 in accordance with an embodiment of the present invention. As was already the case in the previous apparatus 800, apparatus 900 also utilizes hydraulic and/or pneumatic mimesis for applying the outer static pressure $p_a$ to the additional curable material 321. The apparatus 900 differs from the apparatus 800 by a different shape of the tool substrate 810 and of the molding tool 310. While in the apparatus 800, the tool substrate 810 comprises a rectangular shape in a sectional view, in the apparatus 900 shown here, the tool substrate 810 has a T shape in a sectional view, which T shape predefines the channel 820 for hydraulics and/or for compressed air for applying pressure. That surface of the molding tool 310 of the device 900 which faces away from the surface 330 comprises, in contrast to that surface of the molding tool 310 of the apparatus 800 which faces away from the surface 300, a continually flat shape. The mode of operation of the apparatus 900 is analogous to the mode of operation of the apparatus 800.

The apparatus shown in FIGS. 7-9 are limited to the production of a structure and/or lens; usefully, the apparatus shown are arranged in fields of several thousand of said apparatus, for example on a wafer, so as to produce several thousand—corresponding to the number of apparatus—of structures and/or lenses in one process. Therefore, it shall be shown in the following how arrangements of several such apparatus may be configured. It shall be mentioned that the distance between several apparatus within a field will be depicted on a highly reduced scale in the following for reasons of clarity.

Figure 10:
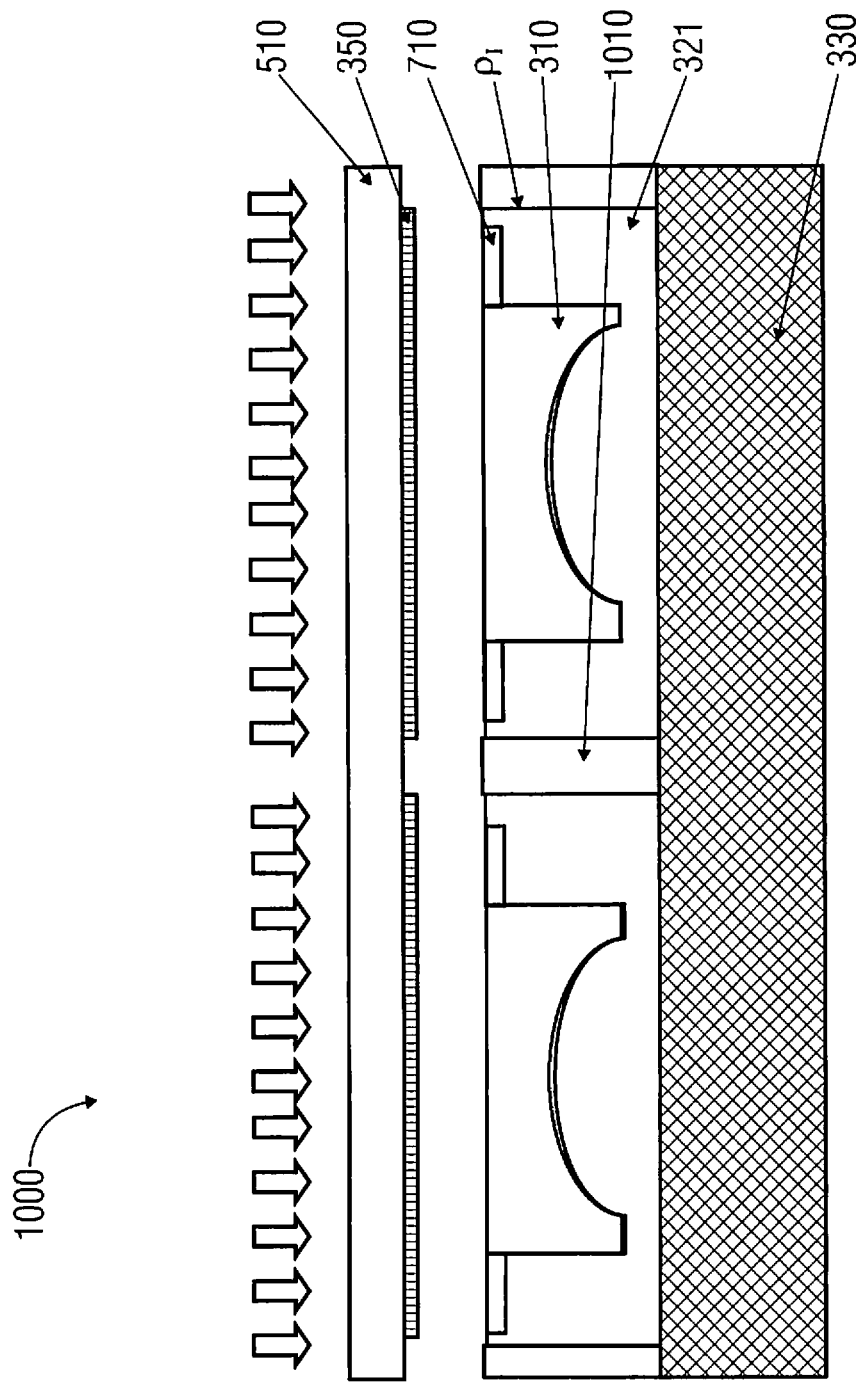
FIG. 10 shows a schematic representation of a sectional view of an apparatus in accordance with an embodiment of the present invention.

FIG. 10 shows a schematic representation of a sectional view of an apparatus 1000 in accordance with an embodiment of the present invention. The apparatus 1000 may include several of the apparatus 700. FIG. 10 shows two apparatus 700 which are separated from each other by circumferential walls 1010 made of cured polymer for implementing a closed cavity.

Thus, the apparatus 1000 enables applying an outer static pressure $p_a$ onto the liquid polymer or curable material 320 without any continuous polymer layer or layer of curable material 320. In other words, a static inner one-off pressure $p_i$ is produced within each partial apparatus 700 of the apparatus 1000.

In order to save polymer material or curable material, which is located between the optically active areas, i.e. areas which are irradiated, a two-part exposure process may be performed. In this context, a first step includes shadowing, by the aperture layer 350, the region of the optical areas of the structure to be produced as well as of the channels for applying the static pressure $p_a$. As a result of the first irradiation, circumferential walls 1010 of cured polymer or cured curable material will form around each optical area, i.e. regions wherein the structures to be produced will be molded later on. The individual optical areas are thus separated from the other areas; in other words, the apparatus 1000 is subdivided into several partial apparatus 700. A static pressure $p_i$ can now be built up, in a second step, in the resulting chambers and/or partial apparatus 700 independently of the other chambers, so as to ensure continuous flow $\phi_P$ of the polymer or additional curable material 321 during the second curing process by the apertures or aperture layers 350, which are variable in terms of diameter. The second curing process, or step 120, of locally varying irradiation is thus performed in accordance with the same pattern as was already described for the method 100.

Figure 11:
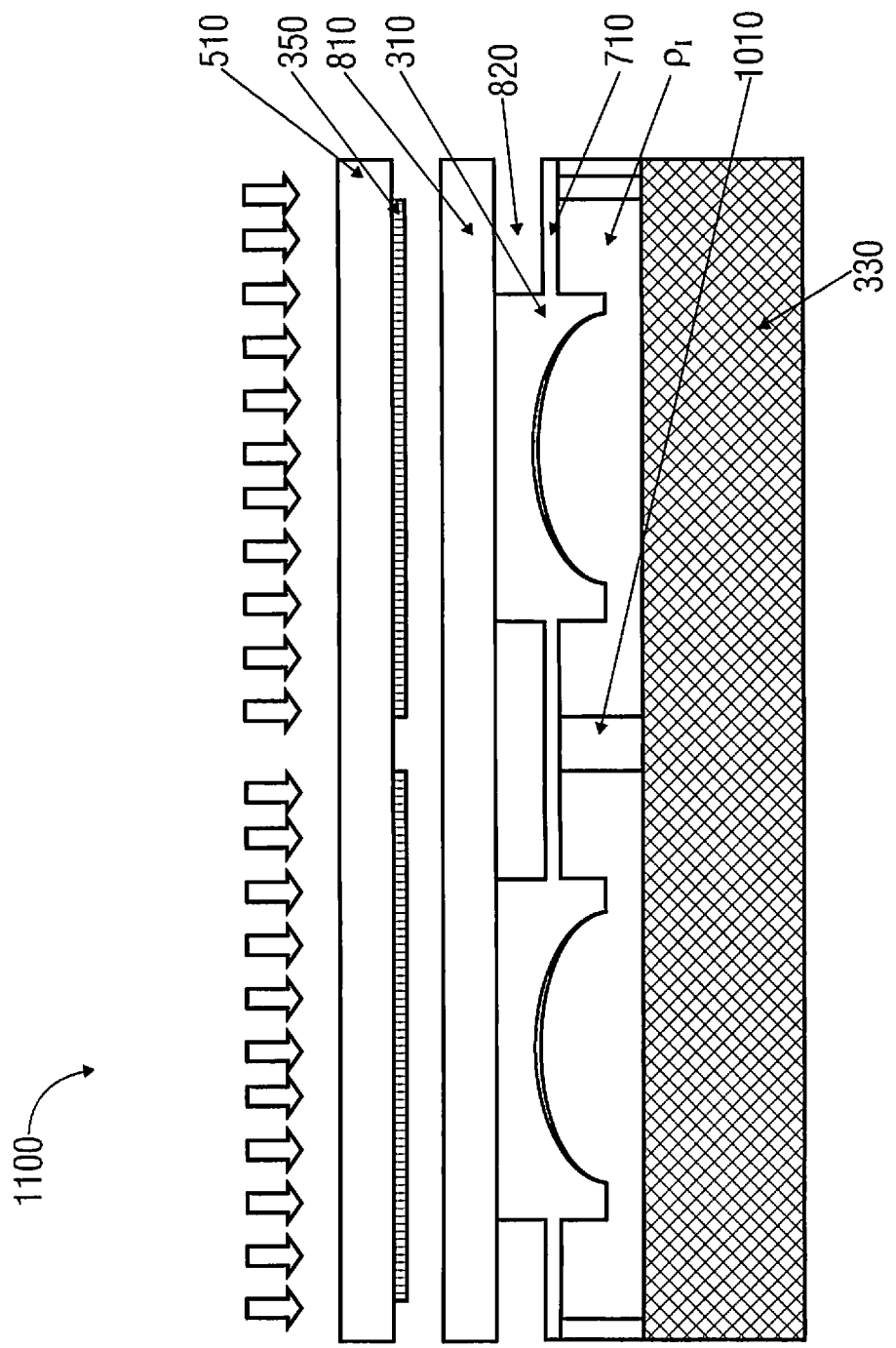
FIG. 11 shows a schematic representation of a sectional view of an apparatus in accordance with an embodiment of the present invention.

FIG. 11 shows a schematic representation of a sectional view of an apparatus 1100 in accordance with an embodiment of the present invention. The apparatus 1100 shows, by analogy with the apparatus 1000, an arrangement of several apparatus 800 separated by circumferential walls 1010 made of cured polymer for realizing a closed cavity. The circumferential walls 1010 are produced in a manner as was already described for the apparatus 1000.

The mode of operation of the apparatus 1100 is analogous to the mode of operation of the apparatus 1000.

Figure 12:
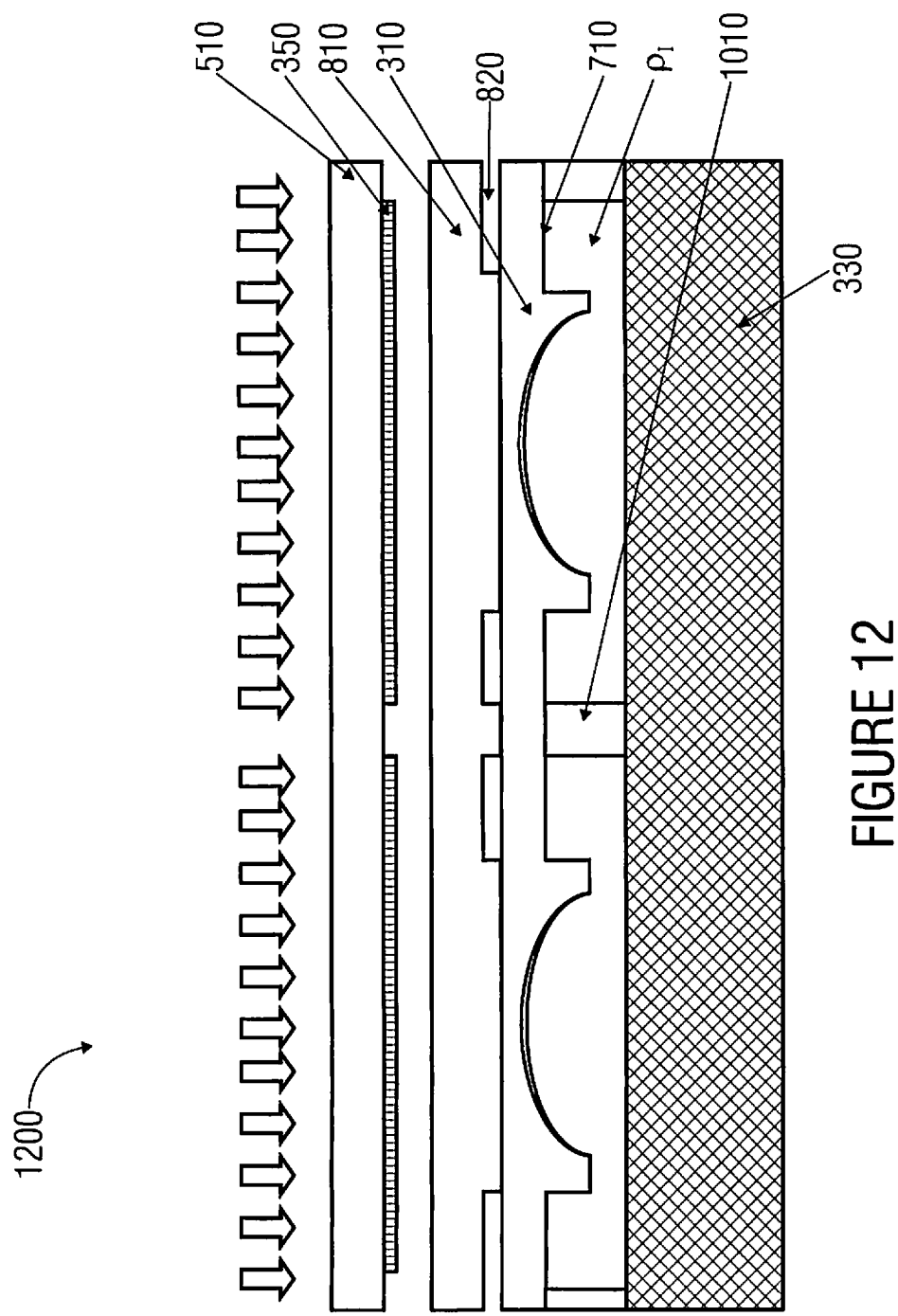
FIG. 12 shows a schematic representation of a sectional view of an apparatus in accordance with an embodiment of the present invention.

FIG. 12 shows a schematic representation of a sectional view of an apparatus 1200 in accordance with an embodiment of the present invention. The apparatus 1200 includes, by analogy with the apparatus 1000 and 1100, an arrangement of several apparatus 900 separated by circumferential walls 1010 made of cured polymer for realizing a closed cavity. The circumferential walls 1010 are produced in a manner as was already described for the apparatus 1000.

The mode of operation of the apparatus 1200 is analogous to the mode of operation of the apparatus 1000 and 1100.

Figure 13:
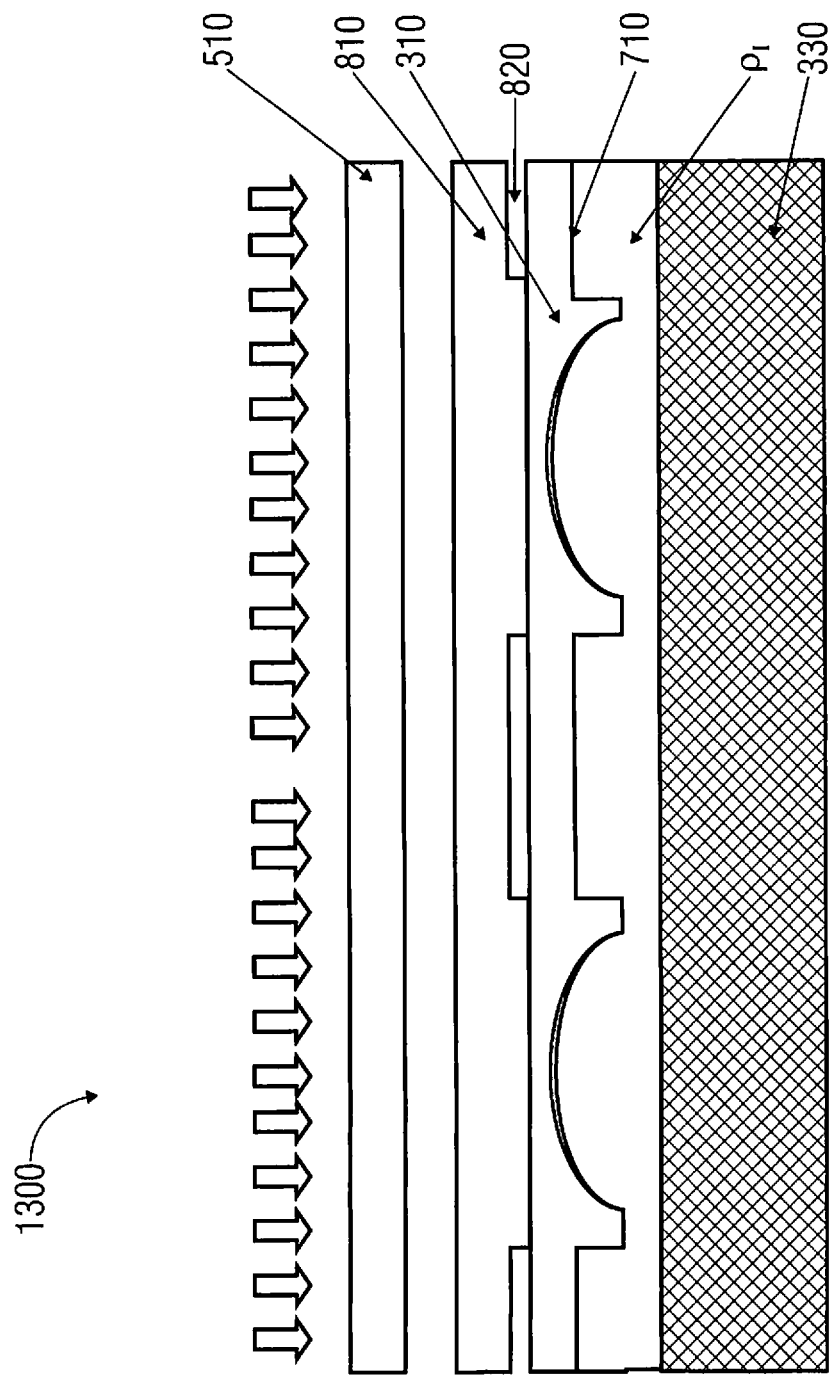
FIG. 13 shows a schematic representation of a sectional view of an apparatus in accordance with an embodiment of the present invention.

FIG. 13 shows a schematic representation of a sectional view of an apparatus 1300 in accordance with an embodiment of the present invention. The apparatus 1300 includes an arrangement of several apparatus 900, which are not separated from one another by circumferential walls of cured polymer. In addition, locally varying irradiation is controlled only by a variable gray filter 510 rather than by a variable aperture layer 350. Since the individual apparatus 900 are not separated by circumferential walls of cured polymer, a first step of curing optically non-active areas may be dispensed with.

Figure 14A:
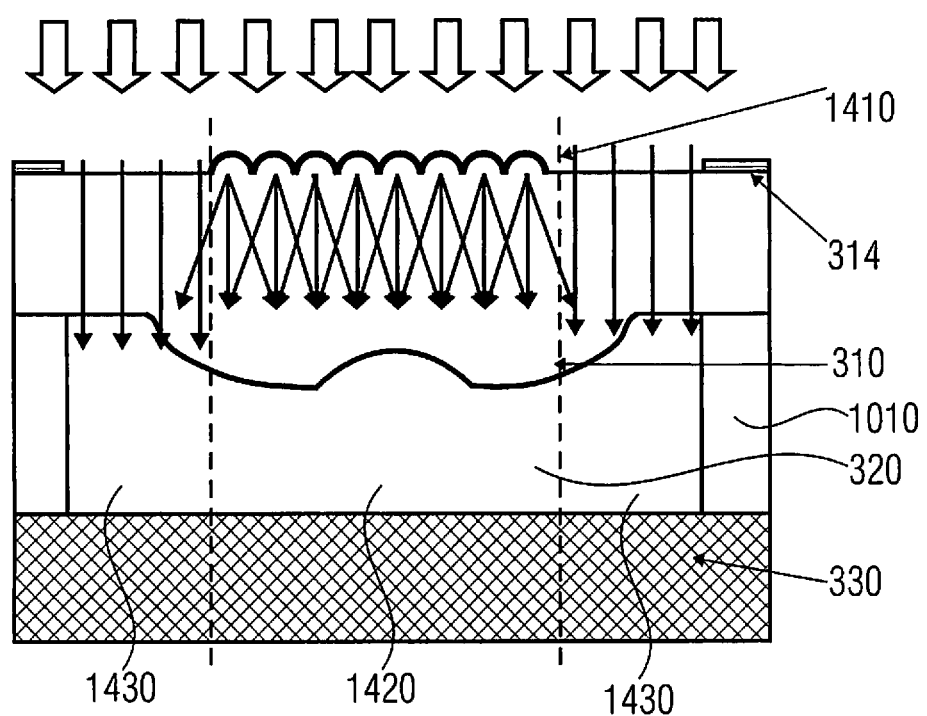
FIG. 14a shows a schematic representation of a sectional view of an apparatus having a molding tool for utilization in an embodiment of the present invention.

FIG. 14a shows a schematic representation of a sectional view of an apparatus comprising a molding tool 310 for utilization in an embodiment of the present invention. The molding tool 310 used in the apparatus shown in FIG. 14a differs from the molding tools shown so far by microstructures 1410 for locally adjusting the divergence of the illumination. In addition, the molding tool 310 shown in FIG. 14a includes aperture structures 314 for producing cavities for storing up volume and/or for producing channels 329, 329' extending perpendicularly to the substrate or surface 330, as is shown in FIG. 6c by means of the molded elements 322e-322f.

Utilization of the molding tool 310 shown in FIG. 14a thus enables spatial control of the divergence in the step 120 of locally varying irradiation. The blocked-off regions for storing up volume of liquid polymer or additional curable material 321 and/or for producing channels 329, 329' extending perpendicularly to the substrate or surface 330, or for producing circumferential walls 1010 are to exhibit as steep structure edges as possible. The latter may be produced by means of a collimated, i.e. parallel illumination with UV radiation as is provided by the mask aligner.

Disadvantageously, collimated—i.e. parallel and, thus, highly directed—illumination or irradiation may result in the formation of refractive index gradients in the polymer or curable material, which leads to striae and, thus, degraded optical function of the cured polymers or materials of the non-blocked-off regions.

To avoid striation, diffuse illumination is therefore recommended. Consequently, simultaneous production of steep structure edges and homogenous refractive index distributions, i.e. striation with previously known flood exposure while utilizing simple tools is not possible.

Utilization of local microstructures 1410 or—as is indicated by 319 at a different location, for example, microlens fields, diffractive structures or diffusers on the molding tool 310 enables local adaptation of the UV radiation which may be used for curing and is irradiated in a collimated manner by the mask aligner. This results in regions 1420 of increased divergence which avoid the formation of striae, on the one hand, but do not allow any steep edges in the profile of the structures, on the other hand. In addition, regions 1430 having steep structure edge curves, but also increased striation, will result. The regions 1420 may predefine an optically active area, for example a lens surface of the structure to be produced. The regions 1430 comprising steep structure curves, which are optically not relevant, may predefine, e.g., the edge regions or edges of the structures to be produced.

Even though in the above-described embodiment, microstructures 1410 are utilized for producing the regions 1420 of increased divergence, the regions 1420 of increased divergence might be produced, in further embodiments, by color or pigment structures on the molding tool 310. Said color or pigment structures may simply be printed on and are therefore simple to produce as compared to microstructures, which require a lot of effort, and may additionally be superimposed with a next layer of the molding tool. Air spaces, as may be used in the utilization of microlenses may be dispensed with in the utilization of the color pigment structures for producing the regions 1420 of increased divergence.

Figure 14B:
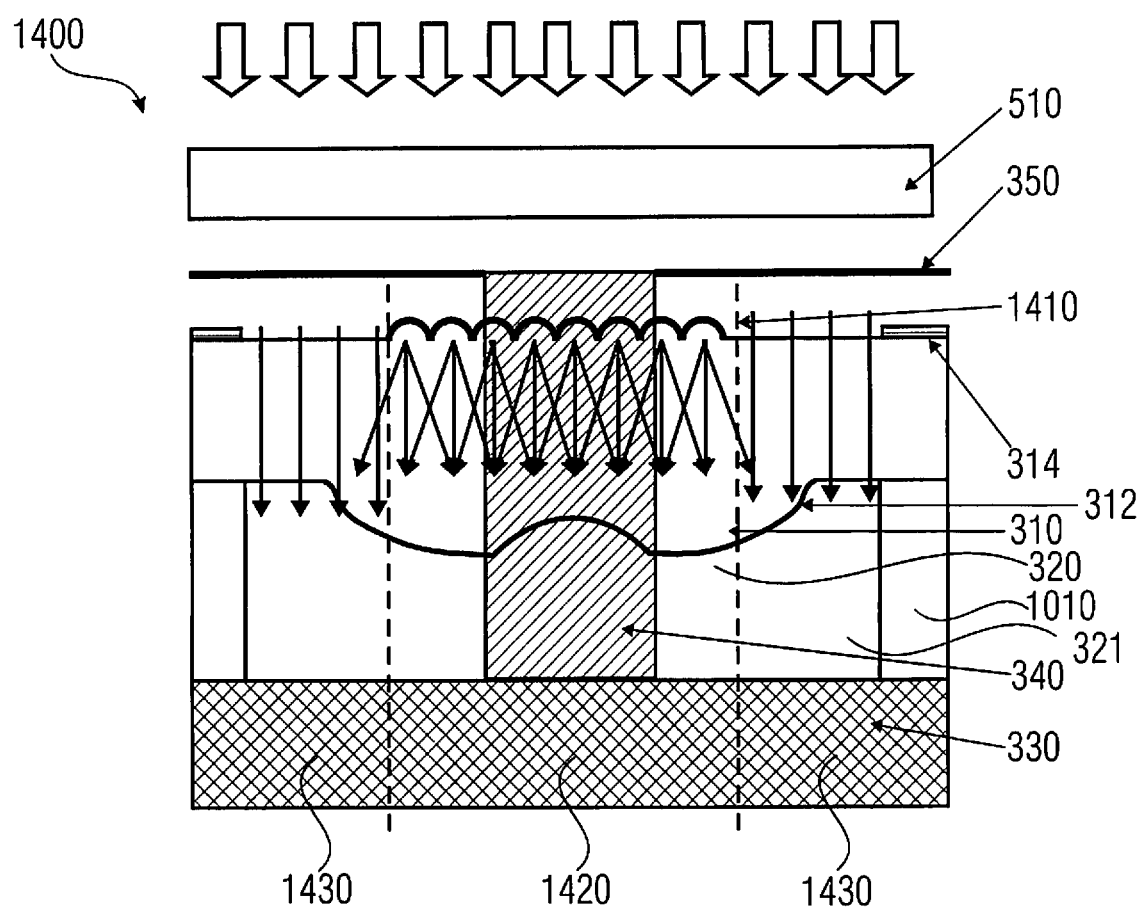
FIG. 14b shows a schematic representation of a sectional view of an apparatus in accordance with an embodiment of the present invention.

FIG. 14b shows a schematic representation of a sectional view of an apparatus 1400 in accordance with an embodiment of the present invention. The apparatus 1400 includes a surface 330, or a substrate 330. A curable material 320 is arranged between a molding face 312 of a molding tool 310 and the surface 330. The molding tool 310 comprises microstructures 1410 for locally adjusting the divergence of the illumination or irradiation. In addition, the molding tool 310 includes aperture structures 314 for producing cavities for storing up volume and/or for producing channels 329, 329' extending perpendicularly to the surface 330 or substrate. A variable aperture layer 350 adjoins a surface of the molding tool 310 which does not face the surface 330. A variable gray filter 510 adjoins a surface of the variable aperture layer 350 which does not face the molding tool 310.

In combination with the variable aperture layer 350, the variable gray filter 510 enables locally varying irradiation of the curable material 320, so that additional curable material 321 may continue to flow so as to compensate for a material shrinkage of the curable material 320. The microstructures 1410 for locally adjusting the divergence of the illumination prevent striation during curing of the curable material 320 and thus improve optical properties in the region 1420 of the increased divergence of the structures produced. Regions 1430 which are irradiated in a collimated manner comprise steep structure edges of the structure produced. Furthermore, the apparatus 1400 shown may be expanded by an apparatus for applying a static pressure, as was already described in previous embodiments.

Locally varying irradiation may advantageously be performed from inside, i.e. from the center of the region 1420 of increased divergence, toward the outside, i.e. to the edge of the region 1420 of increased divergence, so as to improve the optical properties of the structure to be produced.

Figure 15:
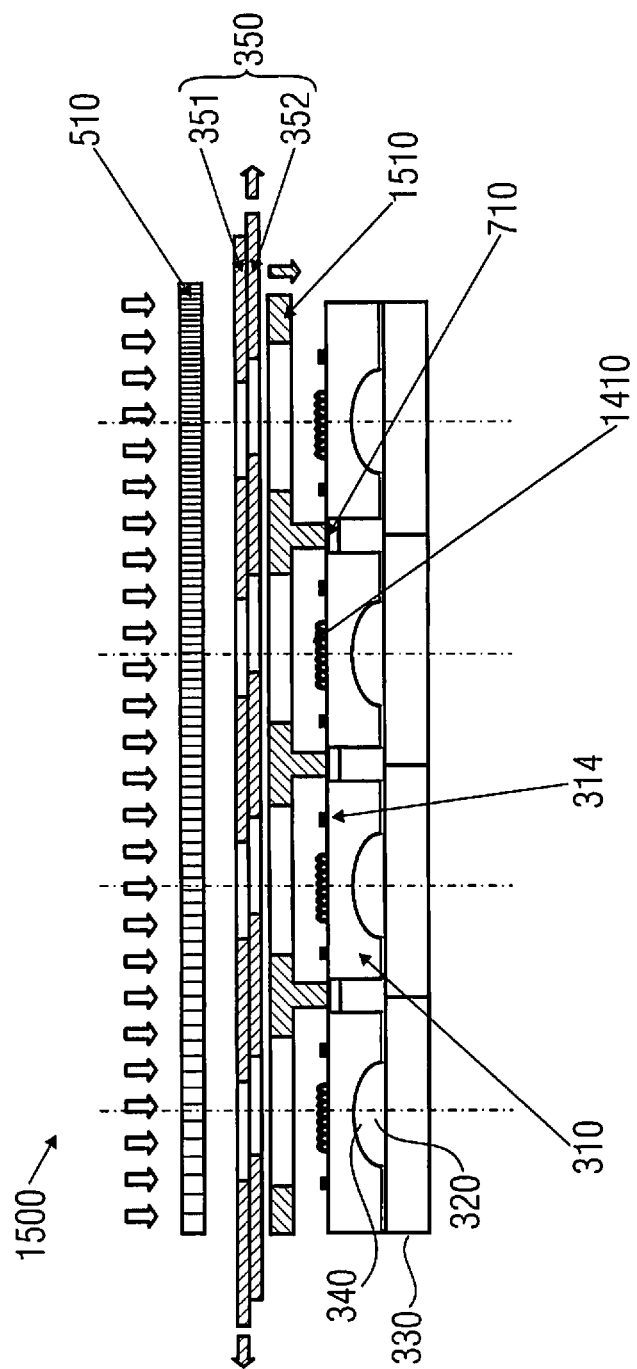
FIG. 15 shows a schematic representation of a sectional view of an apparatus in accordance with an embodiment of the present invention.

FIG. 15 shows a schematic representation of a sectional view of an apparatus 1500 in accordance with an embodiment of the present invention. The apparatus 1500 represents a combination of all of the apparatus shown within one field. The apparatus 1500 includes a surface 330. The surface 330 is adjoined by a field of molding tools 310. There may be curable material 320 in a region 340 between a molding face 312 of the molding tool 310 and the surface 330. The molding tools 310 include microstructures 1410 for locally adjusting the illumination divergence and aperture structures 314 for producing cavities for storing up volume and/or channels 329, 329' extending perpendicularly to the substrate. In addition, the molding tools 310 include elastic membranes 710. The elastic membranes 710 are adjoined by stamps 1510 for applying external static pressure $p_a$. A variable aperture layer 350 is arranged adjacent to a surface of the stamps 1510 which does not face the molding tools 310. The variable aperture layer 350 includes a first aperture field 351 and a second aperture field 352. A variable gray filter 510 is arranged adjacently to a surface of the variable aperture layer 350 which does not face the molding tools 310.

In combination with the aperture layer 350, the variable gray filter 510 enables locally varying irradiation of the curable material 320 through the molding tools 310. During the step 120 of locally varying irradiation, external static pressure $p_a$ is applied to additional curable material 321 by the stamps 1510. The external static pressure $p_a$ leads to an increased pressure $p_i$, which results in a continued flow $\phi_P$ of the additional curable material 321 into the irradiated regions 340 and thus enables improved shrinkage compensation. Utilization of the microstructures 1410 for locally adjusting the illumination divergence enables diffusion of the UV radiation, which is irradiated in a collimated manner by the mask aligner, so as to avoid striation in the optically active regions 1420 of the structures to be produced.

One may state, in summary, that the apparatus 1500 represents an arrangement for low-cost production of, e.g., highly precise optical and mechanical components by means of a replication process on the basis of UV-curable polymers. In this context, the molding tool 310 necessitated for molding is provided with fixed optical elements, for example the microstructures 1410, and variable optical elements, such as the aperture layer 350 or the gray filter 510, which enable temporally variable local adjustment of the transmission function of the molding tool 310 in terms of amplitude and phase. Locally and temporally variable adjustment of the transmission function in terms of amplitude and phase thus results in a compensation for the shrinkage which occurs during UV curing of polymer or the curable material, and thus results in a reduction of occurring mechanical stress acting on the substrate and/or the surface, and in location-dependent production of structures having steep edge curves or low refractive index gradients in the material to be cured.

In other words, said above-mentioned advantages are achieved by temporally controlling the transmission function of the illumination optics, storing up of polymer volume which is not cured, by applying a static pressure to the liquid polymer, and by spatially scattering the divergence. The apparatus 1500 combines all of these above-mentioned functions within one field.

It shall once again be mentioned here that additional polymer volume, i.e. additional curable material 321, for example, may be protected against irradiation by additional aperture structures within the molding tool 310, but that it is also possible, in addition, for additional curable material 321 to continue to flow from an edge region about an optically utilized effective area, such as the region 1420 of increased divergence, of the structure to be produced. This is possible, in particular, if the irradiation is performed, in a temporally sequential manner, starting from the inside, i.e. the optically utilized effective area, i.e. the optically relevant surface of the structure to be produced, toward the outside, i.e. toward the edge region of the structure to be produced. Due to the application of pressure to the additional curable material 321 in the edge region during sequential irradiation, the additional curable material 321 will continue to flow from the edge region into the region of the optically utilized effective area of the structure to be produced. That additional curable material 321 located in the edge region of the structure to be produced which has not been utilized for compensating for the volume shrinkage may be cured, temporally speaking, at the end of the irradiation once the actual lens, i.e. the optically utilized effective area of the structure to be produced, has been cured.

Figure 16:
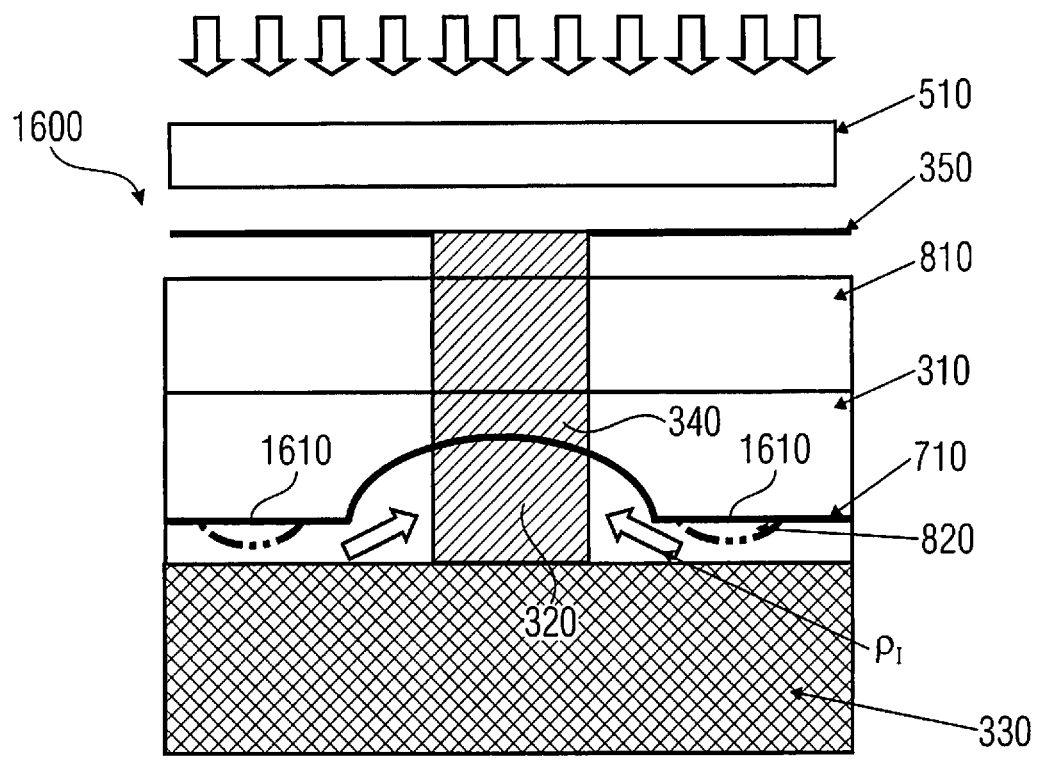
FIG. 16 shows a schematic representation of a sectional view of an apparatus in accordance with an embodiment of the present invention.

Furthermore, FIG. 16 shows a schematic representation of a sectional view of an apparatus 1600 in accordance with an embodiment of the present invention, a simplified design of the molding tool 310 as was already shown in FIGS. 6a-6c having been realized in the apparatus 1600 in contrast to the apparatus shown in FIGS. 7-15. In other words, the molding tool 310 shown in FIG. 16 basically corresponds to the molding tools 310a-310f shown in FIGS. 6a-6c. The simplified tool design of the molding tool 310 without any necessity of openings or channels will result when a surface, for example the surface facing the substrate 330, i.e. the molding face 312 of the molding tool 310, is structured such that there are regions to which an elastic membrane 710 (cf. elastic membrane 316 in accordance with FIGS. 6a-6c) adheres and others to which an elastic membrane 710 does not adhere, as is shown in FIG. 16 by means of the molding tool 310 used in the apparatus 1600. In contrast to the molding tool 310 shown in FIG. 6a, the molding tool 310 may have no more aperture structures 314. In the regions 1610 without adhesion, the elastic membrane 710 may be made to bulge out by applying an outer static pressure $p_a$ by means of pneumatic or hydraulic mimesis. The regions 1610 without adhesion are depicted in broken lines in FIG. 16. The bulging of the elastic membrane 710 is achieved by applying pressure, for example by means of hydraulics or compressed air. The bulging of the elastic membrane 710 then forms a channel 820 extending around the molding tool 310 (cf. channel 318 of FIGS. 6a-6c). The channel 820 is produced in the regions 1610 without adhesion of the elastic membrane 710 to the molding tool 310. The outer static pressure $p_a$ which exists within the channel 820 due to hydraulics or compressed air and which results in the elastic membrane 710 bulging in the regions 1610 without adhesion leads to an inner static pressure $p_i$ in additional curable material 321 which is still liquid, which inner static pressure $p_i$ results in a continued flow of additional curable material 321 for shrinkage compensation in the region 340 of local irradiation. A seal extending around the edge of the wafer or apparatus 1600 may be achieved, in this context, by configuring the adhering/non-adhering regions on the surface of the molding tool 310.

In connection with the simplified molding tool 310, the apparatus 1600 shown in FIG. 16 thus represents a simplified form of the apparatus 800 and 900 shown in FIGS. 8 and 9. The simplified tool design of the molding tool 310 therefore enables potentially cheaper production of the molding tool 310.

Figure 17:
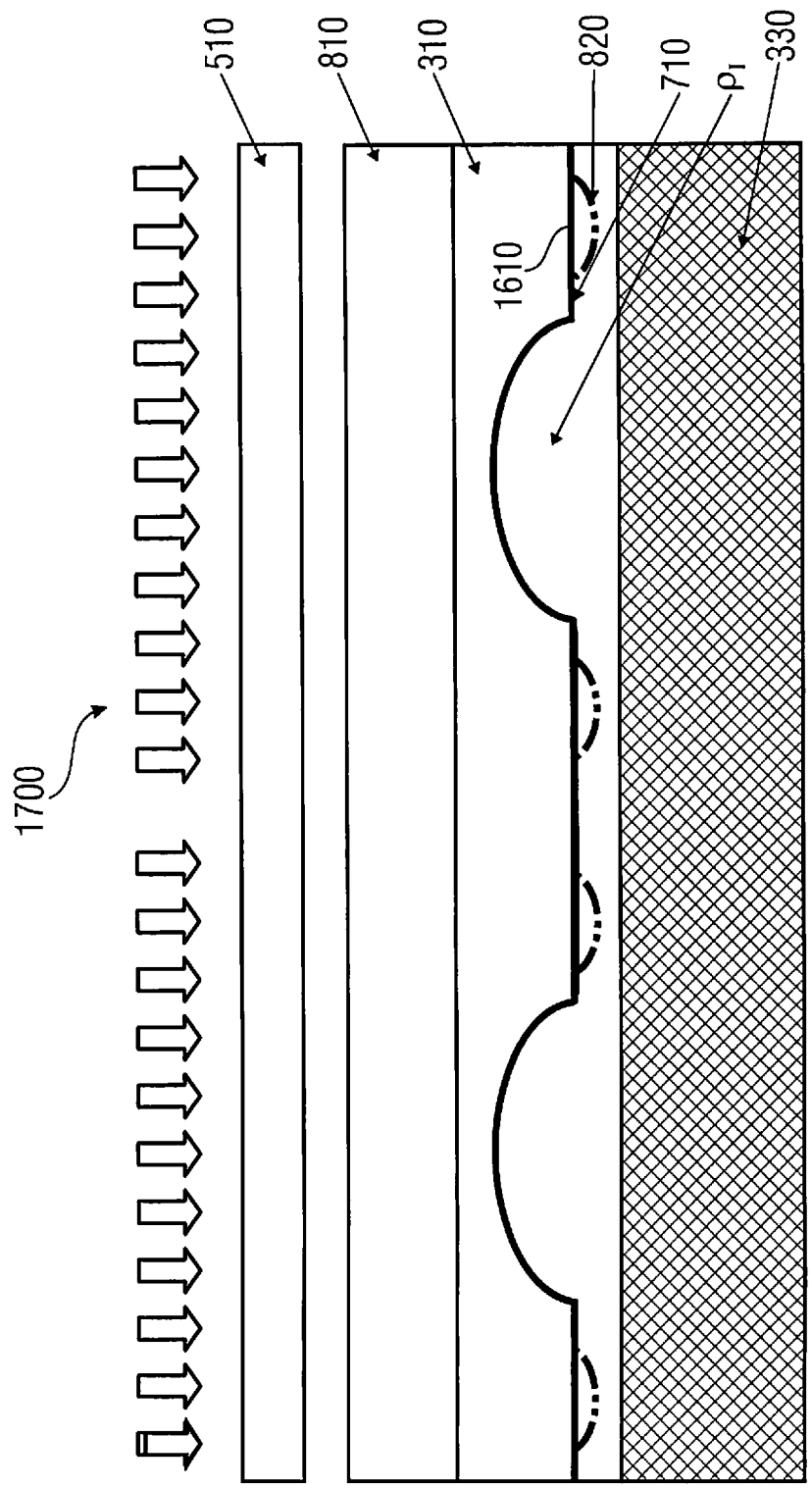
FIG. 17 shows a schematic representation of a sectional view of an apparatus in accordance with an embodiment of the present invention.

FIG. 17 shows a schematic representation of a sectional view of an apparatus 1700 in accordance with an embodiment of the present invention. The apparatus 1700 includes an arrangement of several apparatus 1600, which are not separated from one another by circumferential walls made of cured polymer. The channels 820 for applying static pressure of the individual apparatus 1600 are fluidically interconnected. The outer static pressure $p_a$ in the channels 820 may be produced by pneumatics, for example air, or hydraulics, for example oil. To this end, the apparatus 1700 and/or the wafer comprises a boring at least one position, for example a boring through the surface 330 or substrate 330, so as to supply compressed air or hydraulic fluid. Generation of the pressure $p_a$ by hydraulics has the advantage of a more uniform distribution of the pressure $p_a$ across the entire apparatus 1700 or the entire wafer in contrast to creation of the pressure by means of pneumatics. In addition, the locally varying irradiation is controlled by a variable gray filter 510. The apparatus 1700 may naturally further include a variable aperture layer 350. Since the individual apparatus 1600 are not separated by circumferential walls made of cured polymer, a first step of curing optically non-active areas may be dispensed with.

Figure 18:
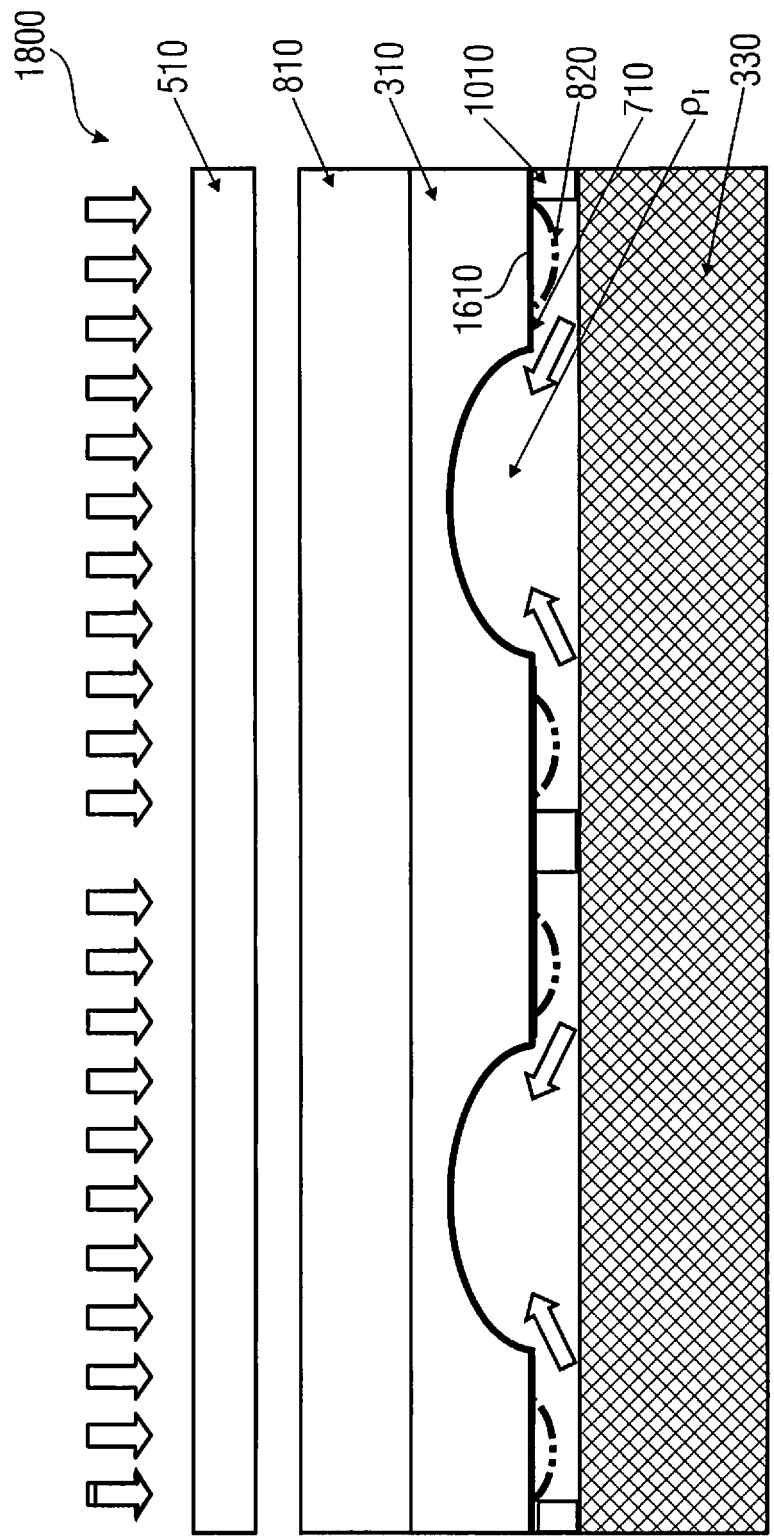
FIG. 18 shows a schematic representation of a sectional view of an apparatus in accordance with an embodiment of the present invention.
Figure 19:
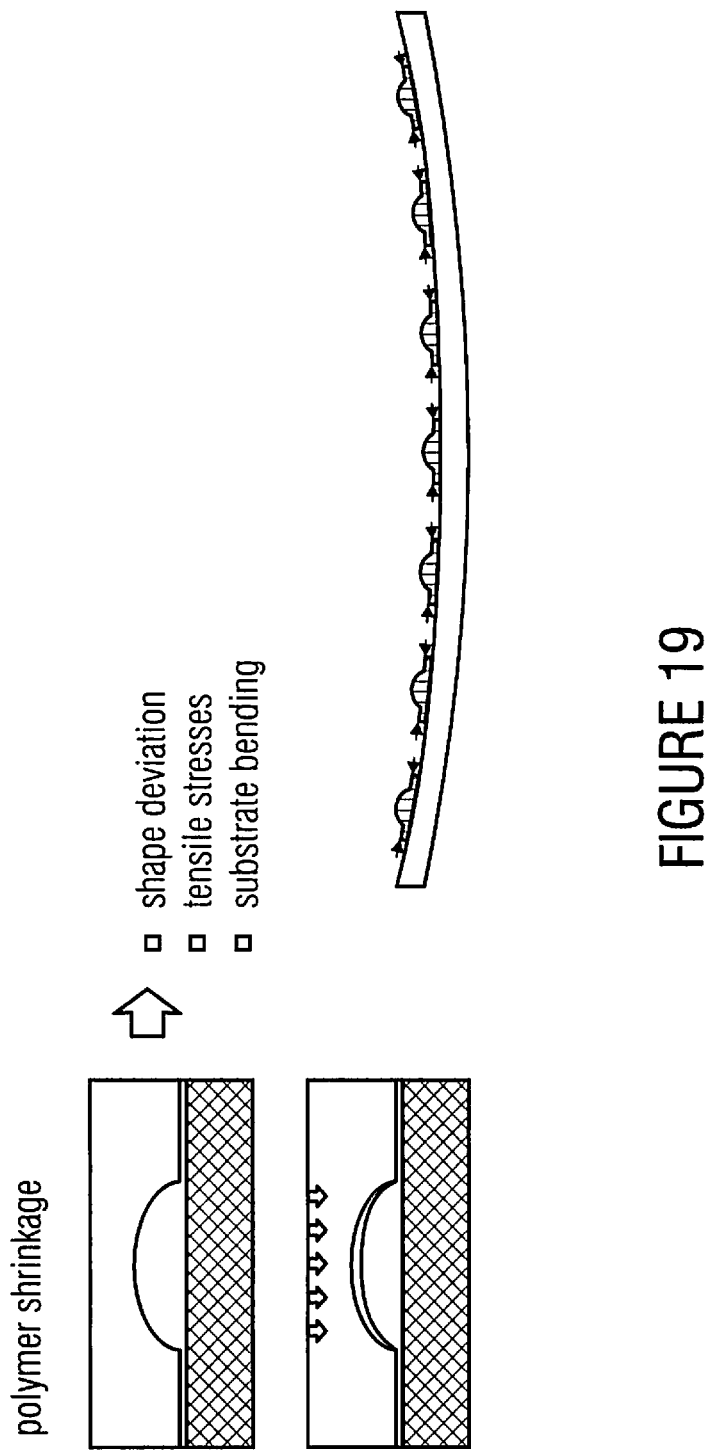
FIG. 19 shows a schematic representation of an already known method of producing structures made of curable material.

FIG. 18 shows a schematic representation of a sectional view of an apparatus 1800 in accordance with an embodiment of the present invention. By analogy with the apparatus 1700, the apparatus 1800 shows an arrangement of several apparatus 1600. In contrast to the apparatus 1700, the individual apparatus 1600 are separated from one another by circumferential walls 1010 made of curable polymer for realizing a closed cavity. In addition, locally varying irradiation within the apparatus 1700 is controlled by a variable gray filter 510. The apparatus 1800 may naturally further include a variable aperture layer 350. Production of the circumferential walls 1010 is effected in the manner as was already described for the apparatus 1000. In this case, too, the individual channels 820 are interconnected to ensure uniform distribution of the outer static pressure $p_a$, which exists within the channels 820 and is produced by a compressor, for example, over the entire apparatus 1800.

In all of the apparatus described, the surface 330 or substrate 330 may be formed of, e.g., a continuously uniform material such as glass, ceramic, glass ceramic, silicon, germanium as well as polymers, which are possibly UV-curing or soluble, or may consist of a structured material, i.e., for example, of a substrate having continuous cavities.

The molding tool 310 may be formed of, e.g., a cured UV polymer, which was molded on the tool substrate 810, which may be made of glass, for example. Of course, the molding tool may be made of a different material in further embodiments.

Even though the embodiments described in FIGS. 3-18 serve to produce a spherical lens or fields of spherical lenses, further embodiments may serve to produce aspherical lenses, free-form areas or other structures made of UV-curable materials.

In addition, in the production of fields of structures, the individual structures may differ in terms of their properties.

Due to the compensation for the volume shrinkage of the polymer during curing, more precise molds of optical, mechanical components may be achieved, in particular for large structural heights of several 100 micrometers. This is a precondition for the production of micro-optical and micro-mechanical components as may be used, above all, in the manufacturing for imaging systems at the wafer level. In addition, mechanical stress, for example on the substrate, which is also due to the shrinkage, may be reduced. Consequently, bending of the wafer, i.e. the substrate, may be reduced, and such wafers may be processed into more complex stacks, as may be used, inter alia, in the production of camera modules at the wafer level.

Embodiments of the present invention may be applied in the manufacturing of micro-optical-electromechanical systems (MOEMS) by replication processes, for example in wafer-level manufacturing of camera objectives and optical sensors.

Even though some aspects have been described in connection with an apparatus, it shall be understood that said aspects also represent a description of the corresponding method, so that a block or a device of an apparatus is also to be understood as a corresponding method step or as a feature of a method step. By analogy therewith, aspects which have been described in connection with or as a method step shall also represent a description of a corresponding block or detail or feature of a corresponding apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method of producing a structure from curable material by molding, the method comprising:
    arranging a molding tool for an optical component, comprising:
        a molding face comprising a surface region for defining an optically relevant surface of the optical component, the molding tool being transparent to irradiation from a side which faces away from the molding face; and
        a membrane layer arranged on the molding face, said membrane layer loosely abutting the molding face in a channel region of the molding face which is laterally adjacent to the surface region, being expandable and being connected, around the channel region, to the molding face in a fluid-tight manner, so that an expandable channel is formed between the molding face and the inner surface of the membrane layer,
    so that the molding faces the surface with not-yet cured curable material being located between the molding face and the surface and so that not the surface is distanced from the channel region with the not-yet cured curable material located between the surface and the expandable channel;
    irradiating the curable material in the surface region in a locally varying manner, so that the not-yet cured curable material cures at different speeds in a laterally varying manner, and
    during the irradiation, applying a pressure within the expandable channel of the molding tool so as to expand the expandable channel and cause a flow of the not-yet cured curable material into the surface region such that shrinkages occurring during curing of the not-yet cured curable material in the surface region are compensated for by the not-yet cured curable material.

2. The method as claimed in claim 1,
wherein said locally varying irradiation is performed, through the molding tool, from a side of the molding tool which faces away from the molding face.

3. The method as claimed in claim 1,
wherein the local variation of the irradiation is performed by a displacement of two apertures comprising locally varying transparencies and/or by a gray filter comprising electrically and/or mechanically adjustable variable transparency.

4. The method as claimed in claim 1,
wherein the locally varying irradiation is performed at least partly through a structure for beam diffusion.

5. The method as claimed in claim 1,
said method comprising producing a plurality of structures; and
the local variation of the irradiation being performed by shifting two aperture fields comprising fixed individual apertures, a distance of the individual apertures corresponding to the distance of the structures to be produced.

6. The method according to claim 1, wherein the molding tool comprises a plurality of surface regions for defining an optically relevant surface of a plurality of optical components, wherein the membrane layer is formed so that the expandable channel extends laterally adjacent the plurality of surface regions or, for each of the plurality of surface regions, a separate expandable channel is provided laterally adjacent to the respective surface region.

* * * * *